US006292705B1

United States Patent
Wang et al.

(10) Patent No.: US 6,292,705 B1
(45) Date of Patent: Sep. 18, 2001

(54) METHOD AND APPARATUS FOR ADDRESS TRANSFERS, SYSTEM SERIALIZATION, AND CENTRALIZED CACHE AND TRANSACTION CONTROL, IN A SYMETRIC MULTIPROCESSOR SYSTEM

(75) Inventors: Yuanlong Wang, Sunnyvale; Zong Yu, Cupertino; Xiaofan Wei, Sunnyvale; Earl T. Cohen, Fremont; Brian R. Baird, Pleasanton; Daniel Fu, Sunnyvale, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/163,294

(22) Filed: Sep. 29, 1998

(51) Int. Cl.$^7$ .................................................. G05B 19/18
(52) U.S. Cl. ............................... 700/5; 700/90; 710/100; 711/146
(58) Field of Search ......................... 700/5, 90; 709/233; 710/100, 29, 146, 141, 122; 711/110, 200, 202, 143, 119

(56) References Cited

U.S. PATENT DOCUMENTS

| 4,315,308 | 2/1982 | Jackson ................................. 710/33 |
| 4,438,494 | 3/1984 | Budde et al. ........................... 714/2 |

(List continued on next page.)

OTHER PUBLICATIONS

Technical White Paper, *Sun™Enterprise™10000* Server, Sun Microsystems, Sep. 1998.
Alan Charlesworth, *Starfire: Extending the SMP Envelope*, IEEE Micro, Jan./Feb. 1998, pp. 39–49.

Joseph Heinrich, *Origin™ and Onyx2™ Theory of Operations Manual*, Document No. 007–3439–002, Silicon Graphics, Inc., 1997.

White Paper, *Sequent's NUMA—Q SMP Architecture*, Sequent, 1997.

(List continued on next page.)

*Primary Examiner*—William Grant
*Assistant Examiner*—Kidest Bahta
(74) *Attorney, Agent, or Firm*—Keith Kind; Kelly H. Hale

(57) ABSTRACT

A preferred embodiment of a symmetric multiprocessor system includes a switched fabric (switch matrix) for data transfers that provides multiple concurrent buses that enable greatly increased bandwidth between processors and shared memory. A Transaction Controller, Transaction Bus, and Transaction Status Bus are used for serialization, centralized cache control, and highly pipelined address transfers. The shared Transaction Controller serializes transaction requests from Initiator devices that can include CPU/Cache modules and Peripheral Bus modules. The Transaction Bus of an illustrative embodiment is implemented using segmented buses, distributed muxes, point-to-point wiring, and supports transaction processing at a rate of one transaction per clock cycle. The Transaction Controller monitors the Transaction Bus, maintains a set of duplicate cache-tags for all CPU/Cache modules, maps addresses to Target devices, performs centralized cache control for all CPU/Cache modules, filters unnecessary Cache transactions, and routes necessary transactions to Target devices over the Transaction Status Bus. The Transaction Status Bus includes both busbased and point-to-point control of the target devices. A modified rotating priority scheme is used to provide Starvation-free support for Locked buses and memory resources via backoff operations. Speculative memory operations are supported to further enhance performance.

20 Claims, 33 Drawing Sheets

U.S. PATENT DOCUMENTS

| | | | |
|---|---|---|---|
| 4,480,307 | | 10/1984 | Budde et al. .......... 710/100 |
| 5,313,609 | | 5/1994 | Baylor et al. .......... 711/121 |
| 5,335,335 | | 8/1994 | Jackson et al. .......... 711/121 |
| 5,440,698 | | 8/1995 | Sindhu et al. .......... 710/33 |
| 5,511,226 | | 4/1996 | Zilka .......... 711/21 |
| 5,513,335 | | 4/1996 | McClure .......... 711/130 |
| 5,524,234 | | 6/1996 | Martinez, Jr. et al. .......... 711/121 |
| 5,535,363 | | 7/1996 | Prince .......... 711/121 |
| 5,537,569 | | 7/1996 | Masubuchi .......... 709/225 |
| 5,537,575 | | 7/1996 | Foley et al. .......... 711/146 |
| 5,553,310 | | 9/1996 | Taylor et al. .......... 711/130 |
| 5,561,779 | * | 10/1996 | Jackson et al. .......... 711/122 |
| 5,568,620 | | 10/1996 | Sarangdhar et al. .......... 711/141 |
| 5,574,868 | | 11/1996 | Marisetty .......... 710/40 |
| 5,577,204 | | 11/1996 | Brewer et al. .......... 711/122 |
| 5,581,729 | | 12/1996 | Nishtala et al. .......... 710/105 |
| 5,588,131 | | 12/1996 | Borrill .......... 711/146 |
| 5,594,886 | | 1/1997 | Smith et al. .......... 711/131 |
| 5,606,686 | | 2/1997 | Tarui et al. .......... 709/216 |
| 5,634,043 | | 5/1997 | Self et al. .......... 711/141 |
| 5,634,068 | | 5/1997 | Nishtala et al. .......... 713/503 |
| 5,644,754 | | 7/1997 | Weber et al. .......... 345/501 |
| 5,655,100 | | 8/1997 | Ebrahim et al. .......... 711/144 |
| 5,657,472 | | 8/1997 | Van Loo et al. .......... 711/158 |
| 5,682,516 | | 10/1997 | Sarangdhar et al. .......... 711/146 |
| 5,684,977 | | 11/1997 | Van Loo et al. .......... 711/170 |
| 5,696,910 | | 12/1997 | Pawlowski .......... 430/170 |
| 5,796,605 | | 8/1998 | Hagersten .......... 700/5 |
| 5,829,034 | | 10/1998 | Hagersten et al. .......... 711/141 |
| 5,895,495 | | 4/1999 | Arimilli et al. .......... 711/156 |
| 5,897,656 | | 4/1999 | Vogt et al. .......... 711/141 |
| 5,940,856 | | 8/1999 | Arimilli et al. .......... 711/119 |
| 5,946,709 | | 8/1999 | Arimilli et al. .......... 711/119 |
| 6,065,077 | * | 5/2000 | Fu .......... 710/100 |

OTHER PUBLICATIONS

White Paper, *Eight–way Multiprocessing*, Hewlett–Packard, Nov. 1997.

George White & Pete Vogt, *Profusion, a Buffered, Cache—Coherent Crossbar Switch*, presented at Hot Interconnects Symposium V, Aug. 1997.

Alan Charlesworth, et al., *Gigaplane—XB: Extending the Ultra Enterprise Family*, presented at Hot Interconnects Symposium V, Aug. 1997.

James Loudon & Daniel Lenoski, *The SGI Origin: A ccNUMA Highly Scalable Server*, Silcon Graphics, Inc., presented at the Proc. of the 24th Int'l Symp. Computer Architecture, Jun. 1997.

Mike Galles, *Spider: A High–Speed Network Interconnect*, IEEE Micro, Jan./Feb. 1997, pp. 34–39.

T.D. Lovett, R.M. Clapp and R.J. Safranek, *NUMA—Q: An SCI—based Enterprise Server*, Sequent, 1996.

Daniel E. Lenoski & Wolf–Dietrich Weber, *Scalable Shared–Memory Multiprocessing*, Morgan Kaufmann Publishers, 1995, pp. 143–159.

David B. Gustavson, *The Scalable Coherent Interface and Related Standards Projects*, (as reprinted in Advanced Multimicroprocessor Bus Architectures, Janusz Zalewski, IEEE Computer Society Press, 1995, pp. 195–207.).

Kevin Normoyle, et al., *UltraSPARC™ Port Architecture*, Sun Microsystems, Inc., presented at Hot Interconnects III, Aug. 1995.

Kai Hwang,*Advanced Computer Architecture: Parallelism, Scalability, Programmability*, McGraw–Hill, 1993, pp. 355–357.

Jim Handy, *The Cache Memory Book*, Academic Press, 1993, pp. 161–169.

Angel L. DeCegama, *Parallel Processing Architectures and VLSI Hardware*, vol. 1, Prentice–Hall, 1989, pp. 341–344.

* cited by examiner

FIG. 5

| | | MODE A | MODE B | MODE C |
|---|---|---|---|---|
| L2 CONFIGURATION | L2 SIZE | 512K, 1M, 2M, 4M | 512K, 1M, 2M, 4M | 512K, 1M, 2M |
| | CACHE LINE SIZE | 64 BYTES | 64 BYTES | 32 BYTES |
| | L2 ASSOCIATIVITY | DIRECT MAPPED & 2-WAY SET ASSOCIATIVE | DIRECT MAPPED & 2-WAY SET ASSOCIATIVE | DIRECT MAPPED & 2-WAY SET ASSOCIATIVE |
| | # OF BANKS | 2 | 2 | 2 |
| TAG ORGANIZATION | TAG ASSOCIATIVITY | 2-WAY SET ASSOCIATIVE | 2-WAY SET ASSOCIATIVE | 2-WAY SET ASSOCIATIVE |
| | SECTORING | 512K, 1M, 2M: NO | 512K, 1M, 2M: NO | 512K, 1M: NO |
| | | 4M: 2 LINES/SECTOR | 4M: 2 LINES/SECTOR | 2M: 2 LINES/SECTOR |

FIG. 6A
FIG. 6B
FIG. 6C

| S0_L0 | S1_L0 | S0_L1 | S1_L1 | ACTION |
|---|---|---|---|---|
| I | I | I | MOESI | UPDATE S0. NO TUB ALLOCATION. |
| I | I | MOES | I | UPDATE S1. NO TUB ALLOCATION. |
| I | I | ES | MOES | UPDATE S0. NO TUB ALLOCATION. INVALIDATE S0_L1. |
| I | I | MO | ES | UPDATE S1. NO TUB ALLOCATION. INVALIDATE S1_L1. |
| I | I | MO | MO | INVALIDATION TO S0_L1. TUB ALLOCATION. UPDATE S0 ONCE S0_L1 INVALIDATED. |
| I | MOESI | I | MOESI | UPDATE S0. NO TUB ALLOCATION. |
| I | MOESI | ES | MOESI | UPDATE S0. NO TUB ALLOCATION. INVALIDATE S0_L1. |
| I | MOESI | MO | MOESI | INVALIDATION TO S0_L1. TUB ALLOCATION. UPDATE S0 ONCE S0_L1 INVALIDATED. |
| MOESI | I | MOESI | I | UPDATE S1. NO TUB ALLOCATION. |
| MOESI | I | MOESI | ES | UPDATE S1. NO TUB ALLOCATION. INVALIDATE S1_L1. |
| MOESI | I | MOESI | MO | INVALIDATION TO S1_L1. TUB ALLOCATION. UPDATE S1 ONCE S1_L1 INVALIDATED. |
| MOES | MOES | MOESI | MOESI | NO TUB ALLOCATION. WAIT FOR S0_L0 OR S1_L0 TO BE INVALIDATED. THE CHOOSE THE WAY WITH S*_L0 BEING INVALIDATED TO REPLACE. FOLLOW THE ACTIONS DESCRIBED ABOVE. |

```
Cycle     Transaction Activity

-10       Processor Bus
-9        *
-8        *
-7        *
-6        Processor Interface
-5        CCU
-4        CCU/CIB transmit
-3        channel wires   (CCU to IIF)
-2*       IIF/CIB receive
-1*       IIF processing
0*        TB request; IIF has command
1*        TB grant; drive address/control onto TB
2*        address/control echoed;
          all interfaces latch address/control
3*        all interfaces observe address/control; compute backoff
          TC predecode; TC tag lookup
          MIF decodes for speculative read
4*        drive backoff
          TC combinatorial scheduler
          TC generates and drives "mem early release"
          initiator/MIF/TC samples backoff
          MIF observes "mem early release"
          backoff and "mem early release" used late in cycle
                by MIF to control speculative request
5*        TC drives Transaction Status Bus
          MIF/CIB transmit speculative request
6         initiator/MIF read Transaction Status Bus
          channel wires   (MIF to MCU)
7         MCU/CIB receive
8         MCU core has request
9         "
          (possible extra cycle for 100MHz alignment  -- not
          counted)
```

FIG. 9B

```
Cycle   Transaction Activity

10      MCU drives DIMM pins   (data arrives 50ns later)
11      "
12      external driver for DIMM pins
13      "
14      DRAM has address
15
16
17
18
19      data back from DRAM   (on MCU pins)
20      MCU has data; ECC compute
        (another cycle needed if bypass cannot happen -- assume
        bypass)
        (another cycle needed if ECC indicates correction needed)
21      MCU/CIB transmit
22      channel wires   (MCU to MIF)
23*     MIF/CIB receive
24*     MIF receive
25*     on Data Switch
26*     IIF receive
        (IIF processing   (not needed for data cycles))
27*     IIF/CIB transmit
28      channel wires   (IIF to CCU)
29      CCU/CIB receive
30      CCU processing
31      Processor interface
        (0 - 3 cycles to align to Processor bus; assume 0 here)
32      Processor transmit
```

FIG. 10A

| VALID TB COMMANDS | DESCRIPTION |
|---|---|
| RDU | NON-CACHEABLE READ. THE INITIATOR DOES NOT CACHE THE DATA. THIS TRANSACTION IS NOT CACHE COHERENT, WHICH MEANS NOT TAG LOOK-UP IS PERFORMED AND NO CACHE STATE TRANSITION IS PERFORMED. |
| RDE | READ EXCLUSIVE. THE TAG LOOK-UP IS PERFORMED. THE INITIATOR WILL CACHE THE LINE IN E STATE. THERE MAY BE LINE REPLACEMENT ASSOCIATED WITH THIS TRANSACTION. |
| RDS | READ SHARED. THE TAG LOOK-UP IS PERFORMED. THE INITIATOR WILL CACHE THE LINE IN S STATE. THE CACHE LINE STATE TRANSITIONS ARE DEFINED BY TPT. THERE MAY BE LINE REPLACEMENT ASSOCIATED WITH THIS TRANSACTION. |
| RDM, BE = 0x00 | READ FOR MODIFY. TAG LOOK-UP IS PERFORMED. WHEN BE = 0x00, THE TRANSACTION DOES NOT DO DATA TRANSFER. THE FINAL CACHE LINE STATE IN THE L2 WILL BE M. THE CONTENT OF THE CACHE LINE IS UNPREDICTABLE. THERE MAY BE LINE REPLACEMENT ASSOCIATED WITH THIS TRANSACTION. |
| RDM, BE = 0xff | READ FOR MODIFY. WHEN BE = 0xff, THE INITIATOR PERFORMS A CACHE LINE READ AND THE FINAL STATE OF THE CACHE WILL BE IN M STATE. THERE IS DATA TRANSFER ASSOCIATED WITH THIS COMMAND. THERE MAY BE LINE REPLACEMENT ASSOCIATED WITH THIS TRANSACTION. |
| RDC | READ COHERENT. THE TAG LOOK-UP IS PERFORMED. THE INITIATOR WILL NOT CACHE THE DATA BEING READ |
| WRU | NON-CACHEABLE WRITE. NO TAG LOOK-UP AND NO CACHE STATE TRANSITION. |
| WRB, BE = 0x00 | WRITE BACK WITH NO DATA TRANSFER. THIS TRANSACTION WILL CHANGE THE CACHE LINE IN THE TAG TO I STATE. |
| WRB, BE = 0xff | WRITE BACK WITH DATA TRANSFER. THIS TRANSACTION WILL CHANGE THE CACHE LINE IN THE TAG TO I STATE AND WRITE BACK A DIRTY LINE TO THE MEMORY. |
| WRC, BE <> 0xff | WRITE COHERENT. SUB-BLOCK WRITE. IF THIS TRANSACTION HITS A DIRTY LINE IN ANOTHER L2, THE DIRTY LINE WILL BE WRITTEN BACK TO THE MEMORY BEFORE THIS TRANSACTION CAN GO ON. |
| WRC, BE = 0xff | WRITE COHERENT. BLOCK WRITE. IF THIS TRANSACTION HITS A DIRTY LINE IN ANOTHER L2, THE DIRTY LINE WILL BE INVALIDATE WITHOUT BEING WRITTEN BACK TO THE MEMORY AND THE MEMORY WILL BE UPDATED WITH THE NEW DATA PROVIDED WITH THIS TRANSACTION. |
| E2M | CACHE STATE TRANSITION E TO M. THE CACHE LINE STATE IN THE TAG WILL BE CHANGED TO M. TAG LOOKUP IS PERFORMED AND ALL OTHER L2 COPIES OF THE LINE WILL BE INVALIDATED AND ALSO WILL BE WRITTEN BACK IF DIRTY. |
| S2M | CACHE STATE TRANSITION S TO M. THE CACHE LINE STATE IN THE TAG WILL BE CHANGED TO M. TAG LOOKUP IS PERFORMED ALL OTHER L2 COPIES OF THE LINE WILL BE INVALIDATED AND ALSO WILL BE WRITTEN BACK IF DIRTY. |
| IACK | INTERRUPT ACKNOWLEDGE, THIS TRANSACTION WILL BE FORWARDED TO THE COMPATIBILITY PCI BUS. |
| SHUT | SHUT DOWN. TREATED BY THE TC AS A NOP, BUT THE INITIATOR WILL BE ACKNOWLEDGED. |
| HALT | HALT. TREATED THE SAME AS SHUTDOWN. |
| INVD | EVICT. THE CACHE LIN IN THE TAG WILL BE INVALIDATED. NO DATA TRANSFER IS PERFORMED EVEN IF THE CACHE IS CURRENTLY IN THE M OR O STATE. |

FIG. 10B

| VALID TB COMMANDS | DESCRIPTION |
|---|---|
| INVD | EVICT. THE CACHE LINE IN THE TAG WILL BE INVALIDATED. NO DATA TRANSFER IS PERFORMED EVEN IF THE CACHE LINE IS CURRENTLY IN THE M OR O STATE. |
| WBINVD | WRITE-BACK AND INVALIDATE. TREATED THE SAME AS SHUTDOWN. |
| FLUSHA | FLUSH ACKNOWLEDGE. THIS TRANSACTION WILL BE FORWARDED TO THE COMPATIBILITY PCI BUS. THE TARGET SHOULD SEND A REPLY TO THE INITIATOR. |
| STPGNT | STOP GRANT. THIS TRANSACTION WILL BE FORWARDED TO THE COMPATIBILITY PCI BUS. THE TARGET SHOULD SEND A REPLY TO THE INITIATOR. |
| SMIACK | SMI ACKNOWLEDGE.. THIS TRANSACTION WILL BE FORWARDED TO THE COMPATIBILITY PCI BUS. THE TARGET SHOULD SEND A REPLY TO THE INITIATOR. |
| LOCKON | LOCK ON. BUS LOCK SET. IF THIS TRANSACTION IS NOT BACKED OFF, THE TC STARTS TO BACK OFF ALL TRANSACTIONS (EXCEPT LOCKOFF, ADDRBOFFRESUME) FROM OTHER CCUs. |
| LOCKOFF | LOCK OFF. BUS LOCK RELEASE. THE TC WILL CLEAR THE BUS LOCK AFTER SEEN THIS COMMAND. |
| IDENTC | CCU IDENTIFICATION. THIS TRANSACTION ACTS LIKE AN IO WRITE COMMAND AND WILL BE FORWARDED TO A TBD IF. |
| IDENTB | BBU IDENTIFICATION. THIS TRANSACTION ACTS LIKE AN IO WRITE COMMAND AND WILL BE FORWARDED TO A TBD IF. |
| IDENTM | MIF IDENTIFICATION. THIS TRANSACTION ACTS LIKE AN IO WRITE COMMAND AND WILL BE FORWARDED TO A TBD IF. |
| MB | MEMORY BARRIER. NOT CLEAR WHAT TO DO. |
| MC | MEMORY BARRIER. NOT CLEAR WHAT TO DO. |
| DRAIN | COMPLETE THINGS. TREATED AS SHUTDOWN. |
| DRAINW | COMPLETE ALL WRITES THEN REPLY. TREATED AS SHUTDOWN. |
| WBOUND | WRITES AFTER THIS TRANSACTION CANNOT PASS PRECEDING READS. TREATED AS SHUTDOWN. |
| AVAIL | RESOURCE AVAILABILITY. TREATED AS SHUTDOWN. |
| ADDRBOFFRESUME | ADDRESS BACK-OFF RESUME.USED TO RESUME TRANSACTIONS BACKED OFF BY A SPECIFIC ADDRESS CACHE (CACHE LINE BOUNDARY) |

FIG. 11A

```
- CMD   D TY    BE     LEN  CID SCID QID ADDR
6 6665  5 55  55555544 44  4444   44 3333 3333
3 2109  8  7  54321098 76  5432   10 9876 5432

ADDR[34:3]
        3322222222221111111111 0000000000
        1098765432109876543210 9876543210
```

FIG. 11B

```
bits  Field Description
63    -     Reserved
62:59 CMD   Command
            0000  RDU  Read Uncacheable
            0001  RDE  Read Exclusive (reply may be RDE or RDS)
            0010  RDS  Read Shared
            0011  RDM  Read for Modify
                       LEN field encodes cache line length (32 or 64)
                       BE field encodings:
                       0x00  No data transfer
                       0xff  Data transfer
            0100  RDC  Read Coherent
                       Similar to RDS but no cache state updates
                       occur. Used for I/O.
            0101   -   Reserved
            0110   -   Reserved
            0111   -   Reserved
            1000  WRU  Write Uncacheable
            1001   -   Reserved
            1010   -   Reserved
            1011  WRB  WriteBack
                       LEN field encodes cache line length (32 or 64)
                       BE field encodings:
                       0x00  No data transfer
                       0xff  Data transfer
            1100  WRC  Write Coherent
            1101   -   Reserved
```

FIG. 11C

```
bits  Field Description
62:59 CMD  Command   (continued)

1110 SOP  Special Operation
                     LEN field always 00
                     BE field encodes which operation:
                     0x01  SHUT      Shutdown
                     0x03  HALT      Halt
                     0x05  INVD      Cache Invalid
                     0x07  WBINVD    WB Cache Invalid
                     0x09  FLUSHA    Flush Ack
                     0x0b  STPGNT    Stop Grant
                     0x0d  SMIACK    SMI Acknowledge
                     0x0e  DRAIN     Complete things
                     0x10  LOCKON    System Lock (reply needed)
                     0x12  LOCKOFF   System Unlock (reply needed)
                     0x14  MB        Memory Barrier (reply needed)
                     0x17  MC        Machine Check
                     0x18  DRAINW    Complete all writes then reply
                     0x1b  WBOUND    Writes after this cannot pass
                                     preceding reads 0x82  IDENTC    CCU Ident (reply needed)
                     0x84  IDENTB    BBU Ident (reply needed)
                     0x86  IDENTM    MCU Ident (reply needed)
                               ADDR   encoded as:
                               38:35 reserved
                               34    compatibility PCI bus
                               33    Mode B processor
                               32    Mode A processor
                               31    Mode C processor
                               30:27 reserved
                               cmd buffers counts
                               26:21 COP
                               20:15 non COP
                               data buffer counts
                               14:9  COP
                               8:3   non COP
                               if a COP value is zero, the
                               non COP value covers both types request gives chip values
                               reply gives FCU values
                     0x90  AVAIL  Resouce Availability
                                  (reply needed)
                               ADDON encoded as:
                               18:27 reserved
                               cmd buffers counts
                               26:21 COP
                               20:15 non COP
                               data buffer counts
                               14:9  COP
                               8:3   non COP
                               if a COP calue is zero, the
                               non COP value covers both types
                     Only those SOPs with the low order BE bit
                     off (ie: those that are even) get a reply.
```

FIG. 11D

```
bits    Field Description

62:59   CMD   Command      (continued)

1110  COP    Cache Operation
                           LEN field always 00
                           BE field encodes which operation:
                           DCCxxNNN
                           xx = Reserved
                           D - Direction
                              0    from processor to FCU
                              1    from FCU to processor
                           DCC - Direction and command
                              000  No operation
                                   NNN must be zero
                              001  E2M - processor E => M request
                                   NNN must be zero
                              010  S2m - processor S -> M request
                                   NNN must be zero
                              011  INVD - processor * -> I notice
                                   NNN must be zero
                              100  No Operation
                                   NNN is new cache line state
                              101  CWR - send cache line as write request
                                   NNN is new cache line state
                              110  CRD - send cache line as read reply
                                   NNN is new cache line state
                              111  CEV - send cache line as write request
                                        (used to evict lines in tag-sectoring)
                                   NNN must be zero
                           NNN - Next tag state
                              000  N - no change
                              001  E - exclusive
                              010  S - shared
                              011  O - owner
                              100  I - invalid
                              101  reserved
                              110  reserved
                              111  reserved The reply for any of the read commands may have
              changed the CMD field to encode what the cache state
              of the line should be (ie, a RDE request may generate
              a RDE reply if the line is in exclusive state or a RDS
              reply if the line is in shared state)
```

FIG. 11E

| bits | Field | Description |
|---|---|---|
| 58 | D | Data Cycles<br>0   No data cycles follow this command header<br>1   At least one data cycle follows command header<br>    (Must look at LEN and BE fields to determine how many) |
| 57:56 | TY | Type<br>00  RQ  Request<br>01  HQ  Hi-Priority request<br>10  RP  Reply<br>11  EP  Error Reply |
| 55:48 | TY | Byte Enable<br>For reads or write encodes which of eight subblocks of the data transmitted is actually valid. Each bit of the BE filed will be a one if the corresponding eighth of the LEN field is valid.<br>For SpecialOperation or CacheOperation commands encodes a sub-command. |
| 47:46 | LEN | Length<br>Length of request for read or write commands.<br>00   8 bytes (one data cycle)<br>01   32 bytes (four data cycles)<br>10   64 bytes (eight data cycles)<br>11   512 bytes (sixty-four data cycles)<br>Always 00 for other types of commands |
| 45:42 | CID | Channel Identifier<br>Which unit made the command request. Replies or Errors are returned to this unit. The following encodings of the CID field are representative, but not mandatory. An implementation might allow replacement of a CCU with additional BBUs, for example.<br>0000  CCU 0<br>0001  CCU 1<br>0010  CCU 2<br>0011  CCU 3<br>0100  CCU 4<br>0101  CCU 5<br>0110  CCU 6<br>0111  CCU 7<br>1000  BBU 0<br>1001  BBU 1<br>1010  Reserved<br>1011  Reserved<br>1100  MCU 0<br>1101  MCU 1<br>1110  MCU 2<br>1111  MCU 3 |

FIG. 11F

```
bits   Field  Description

41:40  SCID   Sub-Channel Identifier
              Each channel identifier may have a variety of devices
              associated with it. Any replies or errors must
              preserve the SCID value that was part of the request.
              The value is implementation specific within each unit.
              For BBUs, one SCID would be PCI bus 0 and another
              would be AGP bus 0 or PCI bus 1.
              For CCUs, the SCID might be used to extend the QID
              field by two more bits.

39:36  QID    Queue Identifier
              Each component that makes requests assigns a QID to
              the request. Any replies or errors must preserve the
              QID value that was part of the request.

35:32  ADDR[38:35]

31:0   ADDR[34:3]
              Address Bits
              ADDR[38] == 0 means I/O address space
              ADDR[38] == 1 means memory address space For Mode A Processors which have PA[34:3], the following
              mapping occurs.
                   PA[34] --> ADDR[38]
                   0000 --> ADDR[37:34]
                   PA[33:3] --> ADDR[33:3]

For Mode B Processors which have PA[34:3], the following
              mapping occurs.
                   PA[43] --> ADDR[38] (xored)
                   PA[37:3] --> ADDR[37:34]
                   PA[42:38] must be zero (???)

For memory addresses going to am MCU, the FCU will
              remove the address bits that select which MCU port
              and which MCU, and shift down all higher order bits
              except for ADDR[38]. ADDR[37] will be set to the
              port number for the MCU )which may be in single
              channel mode).
```

FIG. 11G

```
Command Mappings:

PCI Command                      Channel Command
-----------                      ---------------
0000   Interrupt Ack             RDU in IACK space
0001   Special Cycle             SOP
0010   I/O Read                  RDU, LEN=8, BE=...
0011   I/O Write                 WRU, LEN=8, BE=...
0100   reserved                  -
0101   reserved                  -
0110   Memory Read               RDC
0111   Memory Write              WRC
1000   reserved                  -
1001   reserved                  -
1010   Configuration Read        RDU
1011   Configuration Write       WRU
1100   Memory Read Multiple      RDC
1101   Dual Address Cycle        (internal to BBU)
1110   Memory Read Line          RDC, LEN=<cl>
1111   Memory Write/Invalidate   WRC, LEN=<cl>, BE=0xff
```

FIG. 11H

```
Command Mappings:

AGP Command                      Channel Command
-----------                      ---------------
0000   Read                      RDU, LEN=64, BE=...
0001   Read (hi-priority)        RDU, LEN=64, TY=HQ, BE=...
0010   reserved                  -
0011   reserved                  -
0100   Write                     WRU, LEN=64, BE=...
0101   Write (hi-priority)       WRU, LEN=64, TY=HQ, BE=...
0110   reserved                  -
0111   reserved                  -
1000   Long Read                 RDU, LEN=64, BE=...
1001   Long Read (hi priority)   RDU, LEN=64, TY=HQ, BE=...
1010   Flush                     SOP, BE=DRAINW
1011   reserved                  -
1100   Fence                     SOP, BE=WBOUND
1101   Dual Address Cycle        (internal to BBU)
1110   reserved                  -
1111   reserved                  -
```

FIG. 12A

| SIGNAL NAME | DRIVER | LISTENER | DESCRIPTION |
|---|---|---|---|
| taddr[38:3] | IIF | TC<br>ALL IFs | *taddr[38:3]*, TB address, *taddr[38:3]* follows the PP-Channel address format. See the PP-Channel definitions for details |
| tcmd[3:0] | IIF | TC<br>ALL IFs | *tcmd[3:0]*, TB address, *tcmd[3:0]* can be divided into two categories, PP-Channel commands and miscellaneous commands. tcmd[3] is used to identify these two groups. tcmd[3] = 0 indicates that tcmd[2:0] is defined according to PP-Channel command format while tcmd[3] = 1 indicate that tcmd[2:0] has miscellaneous commands. See PP-Channel definitions for details.<br><br>PP-Channel Commands:<br>Commands    tcmd[3:0]<br>RDE    4'b0000    Read Exclusive<br>RDS    4'b0001    Read Shared<br>RDM    4'b0010    Read for Modify<br>SOP    4'b0011    Special Operation<br>WRI    4'b0100    Write<br>WRB    4'b0101    WriteBack<br>          4'b0110    Reserved<br>COP    4'b0111    Cache Operation<br><br>TB Miscellaneous Commands:<br>Commands    tcmd[3:0]<br>LOCKOFF    4'b1000    To restart the transactions backed-off by *tlock*<br>AddrBoflResume 4'b1001    To restart the transactions backed-off by *taddrboff* at the address indicated by *taddr[38:3]* |
| tbe[7:0] | IIF | TC<br>MIF | *tbe[7:0]*, TB byte enable or sub-channel commands. See PP-Channel definitions for details. |
| tlen[1:0] | IIF | TC<br>MIF | *tlen[1:0]*, TB transaction length. See PP-Channel definitions for details. |
| tiid[3:0] | IIF | TC<br>MIF | *tiid[3:0]*, TB initiator ID. |
| tqid[3:0] | IIF | TC<br>MIF | *tqid[3:0]*, TB queue ID. It is a pointer pointing to the entry of the initiator's internal data structure that holds the information of the TB transaction being driven. |
| tscid[1:0] | IIF | TC<br>MIF | *tscid[1:0]*, TB sub-channel ID. |
| tc | IIF | TC<br>MIF | *tc*, TB cacheable. 0 indicates the transaction is not cacheable while 1 indicates the transaction is cacheable. |
| td | IIF | TC<br>MIF | *td*, TB Data Cycles. 0 indicates no data cycles follow this command while 1 indicates the transaction has one or more data cycles. |

FIG. 12B

| SIGNAL NAME | DRIVER | LISTENER | DESCRIPTION |
|---|---|---|---|
| tp | IIF | TC<br>MIF | *tp*, TB priority. 0 indicates this is a regular transaction. 1 indicates this is a high priority request. |
| tlock | IIF | TC<br>ALL IFs | *tlock*, TB bus back-off. When sampled asserted, it indicates that the transaction two cycles earlier is backed-off. This signal is used by the IFs to lock the entire TB. When the lock is released, backing-off IFs must drive a LOCKOFF transaction on the TB. Any IF backed-off by *tlock* should retry the transaction once LOCKOFF is seen on the TB. |
| taddrboff | IIF | TC<br>ALL IFs | *taddrboff*, TB address back-off. When sampled asserted, it indicates that the transaction two cycles earlier is backed-off. This signal is used by the IFs to lock a specific cache line on the TB. When the lock is released, backing-off IFs must drive an AddrBusBoff transaction on the TB. Any IF backed-off by *taddrboff* should retry the backed-off transaction once AddrBoffResume is seen on the TB and the *taddr[38:3]* matches the backed-off address. |
| tfull | TC<br>MIF<br>CFGIF | TC<br>ALL IFs | *tfull*, acts like a TB busy signal which indicates one or more IFs and/or TC are not ready to accept transactions from the TB. When sampled asserted, it indicates that one or more IF and/or TC are not ready to accept the transaction driven on the TB two cycles earlier. The IF driving that transaction should keep requesting the TB and retrying. |
| tads | IIF | TC<br>ALL IFs | *tads*, TB address strobe. When asserted, it validates the TB transaction. |
| iif_req0-<br>iif_req9 | IIF | TBARB | *iif_req0-iif_req9*, IIF request signals |
| iif_br0-<br>iif_br9 | IIF | TBARB | *iif_br0-iif_br9*, IIF back-off resume cycle indication. When asserted, this signal indicates that the initiating IF is requesting the TB for either BusBoffResume or AddrBoffResume transaction. This signal is defined only for the clock cycles that the corresponding *iif_req* is asserted. |
| iif_sfm0-<br>iif_sfm7 | IIF | TBARB | *iif_sfm0-iif_sfm7*, IIF starvation free mode request. The TBARB can run in both fast mode and starvation free mode (see section X.5.1.1 for details). After sampled asserted, TBARB switches itself into starvation free mode. |
| iif_gnt0-<br>iif_gnt9 | TBARB | IIF | *iif_gnt0-iif_gnt9*, IIF grant signals. |

FIG. 12C

| SIGNAL NAME | DRIVER | LISTENER | DESCRIPTION |
|---|---|---|---|
| tgartboff | MIF | TC<br>All IFs | *tgartboff*, TB GART back-off. When sampled asserted, it indicates that the transaction two cycles earlier is backed-off. This signal is used by the MIF to back-off transactions in the case of GART cache miss. When the lock is released, MIF must drive *tgartboffresume* signal for a cycle. Any IF backed-off by *tgartboff* should retry the transaction once *tgartboffresume* is sampled asserted. |
| tgartboffresume | MIF | All IFs | *tgartboffresume*, TB GART back-off resume. This signal has the similar meaning as AddrBoffResume and BusBoffResume. MIF does not need to be a TB initiator and can avoid all the related troubles when using this signal line instead of a TB transaction to resume the backed-off transactions. This signal can be asserted any time by the MIF for one cycle to resume transactions backed-off by *tgartboff*. This signal does not follow general TB or TSD timing, *tgartboff* and *tgartboffresume* protocol is closely related to the GART cache implementation. |

FIG. 13A

| SIGNAL NAME | DRIVER | LISTENER | DESCRIPTION |
|---|---|---|---|
| tsaddr[38:3] | TC | IIF<br>CFGIF | *tsaddr[38:3]*, TSB address. *tsaddr[38:3]* is the latched *tsaddr[38:3]*. |
| tsraddr[38:8] | TC | IIF<br>MIF | *tsraddr[38:8]*, TSB replacement address. |
| tsren[3:0] | TC | IIF<br>MIF | *tsren[3:0]*, TSB replacement enable. Together with *tsraddr[38:8]*, *tsren[3:0]* determines the cache lines that need to be replaced. For example, 4'b0001 means address[38:6] = (*tsraddr[38:8]*, 00) needs to be replaced; 4'b0100 means (*tsraddr[38:8]*, 10) needs to be replaced; while 4'b0101 means that both (*tsraddr[38:8]*, 00) and (*tsraddr[38:8]*, 10) need to be replaced.<br><br>The replacement of a cache line means 1) generating a probe with RID to invalidate the cache line at the address specified by *tsraddr[38:8]*, and *tsren[3:0]*. 2) writing back the cache line if it is dirty. |
| tsrmoesi0[2:0] | TC | IIF | *tsrmoesi0[2:0]*, current MOESI state of line 0 of the sector being replaced. During line replacement, IIFs may detect cache state inconsistency error by comparing the cache line state provided by this signal with the cache line state returned by probe response. |
| tsrmoesi1[2:0] | TC | IIF | *tsrmoesi1[2:0]*, current MOESI state of line 1 of the sector being replaced. |
| tscmd[3:0] | TC | IIF<br>CFGIF | *tscmd[3:0]*, TSB command. *tscmd[3:0]*, is the latched *tscmd[3:0]*. |
| tsdcmd[3:0] | TC | IIF<br>MIF<br>CFGIF | *tsdcmd[3:0]*, TSB decoded command. Based on FCU memory map, TC decodes *tscmd[3:0]*, into a smaller set of commands called decoded commands, *tsdcmd[3:0]*, provides the IFs with the necessary transaction type information.<br><br>Decoded<br>Commands  tsdcmd[3:0]<br>MemRd  4'b0000  Memory read (both host mem and IO mem)<br>MemWr  4'b0001  Memory write (both host mem and IO mem)<br>IORd  4'b0010  x86 IO space read<br>IOWr  4'b0011  x86 IO space write<br>AGPRd  4'b0100  AGP region read<br>AGPWr  4'b0101  AGP region write<br>GARTRd  4'b0110  GART read<br>GARTWr  4'b0111  GART write<br>SSMConfigRd  4'b1000  SSM configuration space read<br>SSMConfigWr  4'b1001  SSM configuration space write<br>SpecialCycle  4'b1111  x86 special cycle, tsbe[7:0] has encoded special cycle type. See PP-Channel definitions for details. |

FIG. 13B

| SIGNAL NAME | DRIVER | LISTENER | DESCRIPTION |
|---|---|---|---|
| tsbe[7:0] | TC | IIF<br>CFGIF | *tsbe[7:0]*, TSB byte enable or sub-channel commands. See PP-Channel definitions for details. |
| tsiid[3:0] | TC | IIF<br>CFGIF | *tsiid[3:0]*, TSB initiator ID. It is driven by the TC with the value latched from *tsiid[3:0]*. |
| tstid[3:0] | TC | IIF | *tstid[3:0]*, TSB target ID. TC uses *tstid[3:0]* to indicate the target of the current transaction. |
| tsqid[3:0] | TC | IIF<br>CFGIF | *tsqid[3:0]*, TSB queue ID. It is driven by the TC with the value latched from *tsqid[2:0]*. |
| tsscid[1:0] | TC | IIF<br>CFGIF | *tsscid[1:0]*, TSB sub-channel ID. It is driven by the TC with the value latched from *tsscid[2:0]*. |
| tsc | TC | IIF<br>CFGIF | *tsc*, TSB Cacheable *tsc* is the latched *tc*. |
| tsd | TC | IIF<br>CFGIF | *tsd*, TSB Data cycles. *tsd* is the latched *td*. |
| tsp | TC | IIF<br>CFGIF | *tsp*, TSB priority. *tsp* is the latched *tp*. |
| tslen[1:0] | TC | IIF<br>CFGIF | *tslen[1:0]*, TSB transaction length. *tslen[1:0]* is the latched *tlen[1:0]* |
| tsfinish | TC | IIF | *tsfinish*, TSB transaction finish. It is driven by the TC and sampled by the initiator. When asserted, tsfinish indicates that all the IFs with *if_ctl not set to Nop have latched the transaction from TSB. |

FIG. 13C

| SIGNAL NAME | DRIVER | LISTENER | DESCRIPTION |
|---|---|---|---|
| iif_ctl0[3:0]-<br>iif_ctl9[3:0] | TC | IIF | *iif_ctl0[3:0]-iif_ctl9[3:0]*, point-to-point IIF control signals.<br>They are driven by the TC to each individual IIF.<br><br>Commands    iif_ctl0[3:0]-iif_ctl7[3:0]<br>IIF_Nop    4'b0000  Nop<br>IIF_ValidCmd    4'b0001  Valid command is returned on *tscmd[3:0]* and *tsdcmd[3:0]*.<br>IIF_RdM    4'b0010  Probe L2. Read and return the cache line to the initiator (*tsiid[3:0]*). Cache line currently in M/O. No state transaction.<br>IIF-RdMInv    4'b0011  Probe L2. Read and return the cache line to the initiator (*tsiid[3:0]*). Cache line currently in M/O. Invalidate the cache line.<br>IIF_RdMToO    4'b0100  Probe L2. Read and return the cache line to the initiator (*tsiid[3:0]*). Cache line currently in M. Cache line state transition M->O.<br>IIF_WrMInv    4'b0101  Probe L2. Write back the cache line to the target (*tstid[3:0]*). Cache line currently in M/O. Invalidate the cache line. Finally, initiate a AddrBoffResume transaction on the TB to restart any transactions that have been backed-off by IFF_AddrBoff command.<br>IIF_EToS    4'b0110  Probe L2. No data transfer. Cache line currently in E. Cache line state transition E->S.<br>IIF_Inv    4'b0111  Probe L2. No data transfer. Cache line currently in E/S/I. Invalidate the cache line. |

FIG. 13D

| SIGNAL NAME | DRIVER | LISTENER | DESCRIPTION |
|---|---|---|---|
| iif_ctl0[3:0]-<br>iif_ctl9[3:0] | TC | IIF | *iif_ctl0[3:0]-iif_ctl9[3:0]*, point-to-point IIF control signals.<br>They are driven by the TC to each individual IIF.<br>*(continued)*<br><br>Commands    iif_ctl0[3:0]-iif_ctl7[3:0]<br><br>IIF_RdAckS    4'b1000    Read acknowledge to the initiator. The cache state of the cache line being read is S.<br>IIF_RdAckE    4'b1001    Read acknowledge to the initiator. The cache state of the cache line being read is E.<br>IIF_RdAckM    4'b1010    Read acknowledge to the initiator. The cache state of the cache line being read is M.<br>IIF_Ack    4'b1011    Acknowledge to the initiator for write transactions and for transactions that do not need a cache line state.<br>IIF_AddrBoff    4'b1100    Initiator address backoff. The initiator should treat this command the same as *taddrboff* and the same AddrBoffResume protocol follows. TC uses this command in the case of a TB transaction causing a dirty line to be written back to the memory. The initiator of the TB transaction is backed off by the TC and will be resumed by the IIF having the dirty line once the line is written back to the memory.<br>IIF_TargetSelf    4'b1101    The initiator is targeting itself.<br>IIF_TargetError    4'b1110    No target for the current transaction. |

FIG. 13E

| SIGNAL NAME | DRIVER | LISTENER | DESCRIPTION |
|---|---|---|---|
| iif_trdy0-<br>iif_trdy9 | IIF | TC | *iif_trdy0-iif_trdy9*, point-to-point IIF ready signals. *iif_trdy* is driven by each individual IIF to the TC. The IIF uses its *iif_trdy* to indicate whether it is ready to accept *iif_ctl[3:0]* control command. |
| iif_crd_rel0-<br>iif_crd_rel9 | TC | IIF | *iif_crd_rel0-iif_crd_rel9*, point-to-point IIF cacheable read release signal. iif_crd_rel is driven by the TC to each individual IIF. This signal is asserted for one cycle when the TC determines that a cacheable read transaction does not need a TAG Update Buffer (TUB) entry or when a TUB entry is freed. The IIF uses this signal to count down its internal Outstanding Cacheable Read Counter. This signal can be asserted any time by the TC and it does not follow general TB or TSB timing. |
| mif_ctl [1:0] | TC | MIF | *mif_ctl [1:0]*, point-to-point MIF control signals. It is driven by the TC to the MIF.<br><br>Commands     mif_ctl [1:0]<br>MIF_Nop    2'b00    Nop<br><br>MIF_ValidCmd    2'b01    Valid command is returned on *tscmd[3:0]* and *tsdcmd[3:0]*. See the description of *tsdcmd[3:0]* for details.<br>MIF_Cancel    2'b10    The MIF latches transactions that possibly target itself from TB. This control command cancels the transaction on top of the MIF's incoming queue after TC finds out that transaction is not targeting the MIF. |
| mif_trdy | MIF | TC | *mif_trdy*, point-to-point MIF ready signal. *mif_trdy* is driven by the MIF to the TC. The MIF uses its *mif_trdy* to indicate whether it is ready to accept *mif_ctl[1:0]* control command. |
| cfgif_ctl | TC | CFGIF | *cfgif_ctl*, point-to-point CFGIF control signals. It is driven by the TC to the CFGIF.<br><br>Commands    cfg_ctl<br>CFGIF_Nop    1'b0    Nop<br>CFGIF_ValidCmd    1'b1    Valid command is returned on *tscmd[3:0]* and *tsdcmd[3:0]*. See the description of *tsdcmd[3:0]* for details. |
| cfgif_trdy | CFGIF | TC | *cfgif_trdy*, point-to-point CFGIF ready signal. *cfgif_trdy* is driven by the CFGIF to the TC. The CFGIF uses its *cfgif_trdy* to indicate whether it is ready to accept *cfgif_ctl* control command. |

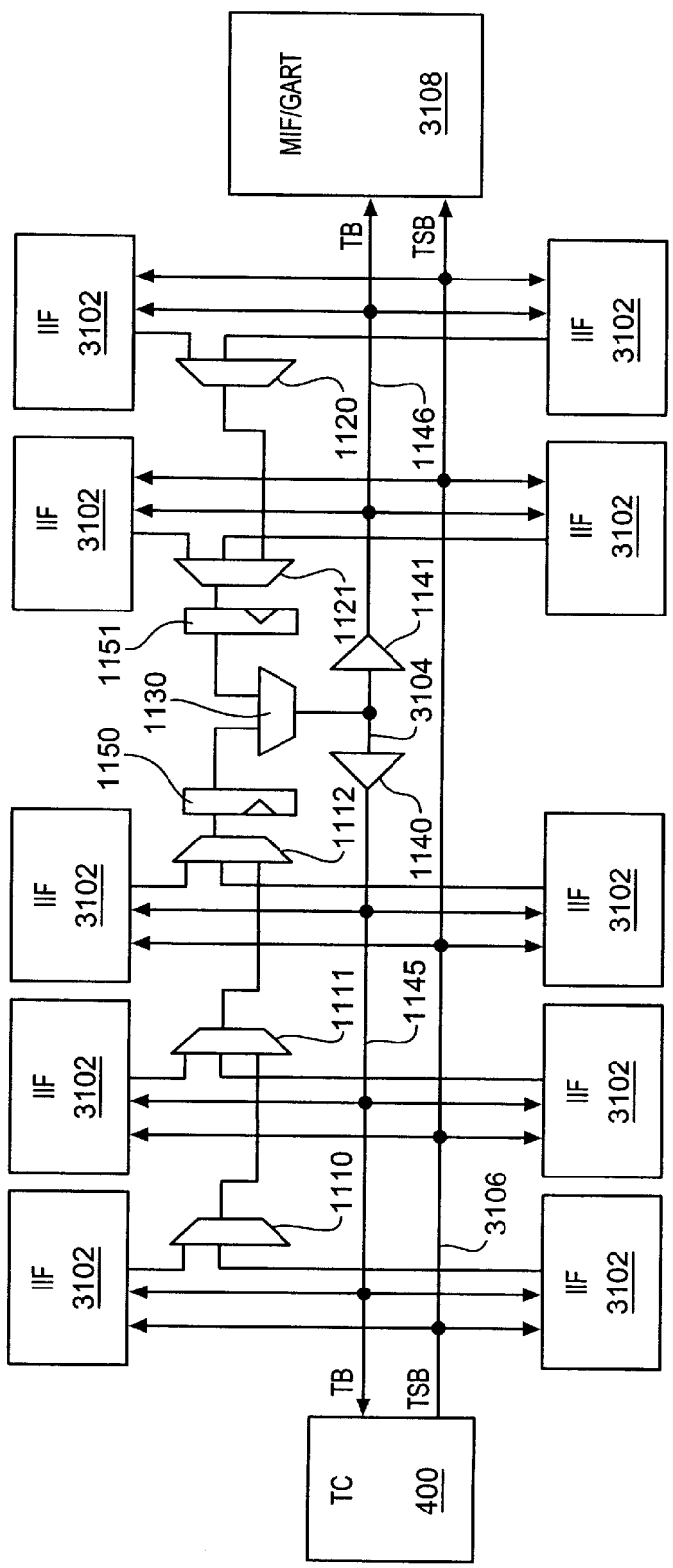
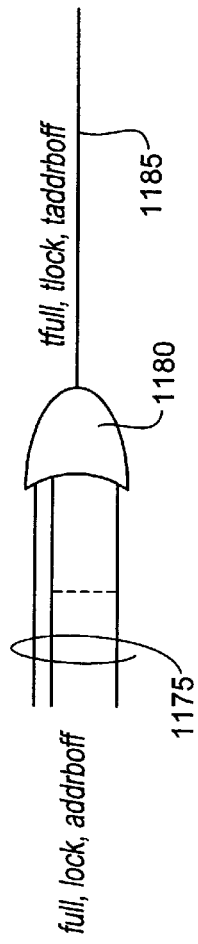
FIG. 14A
FIG. 14B

METHOD AND APPARATUS FOR ADDRESS TRANSFERS, SYSTEM SERIALIZATION, AND CENTRALIZED CACHE AND TRANSACTION CONTROL, IN A SYMETRIC MULTIPROCESSOR SYSTEM

BACKGROUND

The system of FIG. 1 is a prototypical prior art symmetric multiprocessor (SMP) system 100. This traditional approach provides uniform access to memory 130 over a shared system bus 110. Each processor 120 has an associated cache and cache controller. The caches are individually managed according to a common cache coherency protocol to insure that all software is well behaved. The caches continually monitor (snoop) the shared system bus 110, watching for cache updates and other system transactions. Transactions are often decomposed into different component stages, controlled by different system bus signals, such that different stages of multiple transactions may be overlapped in time to permit greater throughput. Nevertheless, for each stage, subsequent transactions make sequential use of the shared bus. The serial availability of the bus insures that transactions are performed in a well-defined order. Without strong transaction ordering, cache coherency protocols fail and system and application software will not be well behaved.

A first problem with the above-described traditional SMP system is that the serial availability of the bus limits the scalability of the SMP system. As more processors are added, eventually system performance is limited by the saturation of the shared system bus.

A second problem of traditional SMP systems is that multiple cycles are required to process each transaction. This is partially attributed to the use of multi-point tri-state busing of lightly pipelined transactions.

A third problem exists for existing SMP systems using pipelined bus structures. Difficulties may arise from permitting an initiator to perform locked operations. Normally, a simple priority scheme (such as a rotating priority) is used to permit all initiators to generate transactions on an equal access basis. Locked operations permit transaction initiators to make a number of subsequent transactions without surrendering the bus to other initiators in the short term. This is necessary to implement semaphores used to prevent race and deadlock conditions. Unfortunately, interactions between such locked operations and simple bus priority schemes may result in an initiator being starved for access for excessive periods.

What is needed is an SMP system architecture that provides greater scalability by permitting concurrent use of multiple buses, while still providing a system serialization point to maintain strong transaction ordering and cache coherency. What is also needed is an SMP architecture that further provides increased transaction throughputs. Additionally, an SMP architecture is needed to enable locked operations while preventing initiator starvation.

SUMMARY

A preferred embodiment of a symmetric multiprocessor system includes a switched fabric (switch matrix) for data transfers that provides multiple concurrent buses that enable greatly increased bandwidth between processors and shared memory. A Transaction Controller, Transaction Bus, and Transaction Status Bus are used for serialization, centralized cache control, and highly pipelined address transfers. The shared Transaction Controller serializes transaction requests from Initiator devices that can include CPU/Cache modules and Peripheral Bus modules. The Transaction Bus of an illustrative embodiment is implemented using segmented buses, distributed muxes, point-to-point wiring, and supports transaction processing at a rate of one transaction per clock cycle. The Transaction Controller monitors the Transaction Bus, maintains a set of duplicate cache-tags for all CPU/Cache modules, maps addresses to Target devices, performs centralized cache control for all CPU/Cache modules, filters unnecessary Cache transactions, and routes necessary transactions to Target devices over the Transaction Status Bus. The Transaction Status Bus includes both bus-based and point-to-point control of the target devices. A modified rotating priority scheme is used to provide Starvation-free support for Locked buses and memory resources via backoff operations. Speculative memory operations are supported to further enhance performance.

BRIEF DESCRIPTION OF DRAWINGS

FIG. 5 is a table listing the L2 configuration and TAG organization used in accordance with the operating mode of the preferred TC embodiment.

FIGS. 6A, 6B, and 6C are drawings that illustrate address mappings used in accordance with the operating mode of the preferred TC embodiment.

FIG. 8 is a table listing the Replacement policy and TUB Allocation used by the TC for a 2-line per sector Tag RAM (called TAG).

FIGS. 9A and 9B illustrate an example Transaction Protocol Table for the case of a block read operation.

FIGS. 10A and 10B are a table of Transaction Bus commands.

FIGS. 11A trough 11H are a continuing table detailing the Point-to-Point Channel (PP-Channel) definitions.

FIGS. 12A through 12C are a continuing table describing the various TB signals and identifying their associated driver and listeners.

FIGS. 13A through 13E are a continuing table of describing the various TSB signals and identifying their associated driver and listeners.

FIG. 14A is an abstract block diagram that shows the relationship of the TB and TSB to the rest of the system for a particular implementation. FIG. 14B is an abstract logical diagram showing the derivation of certain control signals for the TB and TSB.

DETAILED DESCRIPTION

Figure 1:
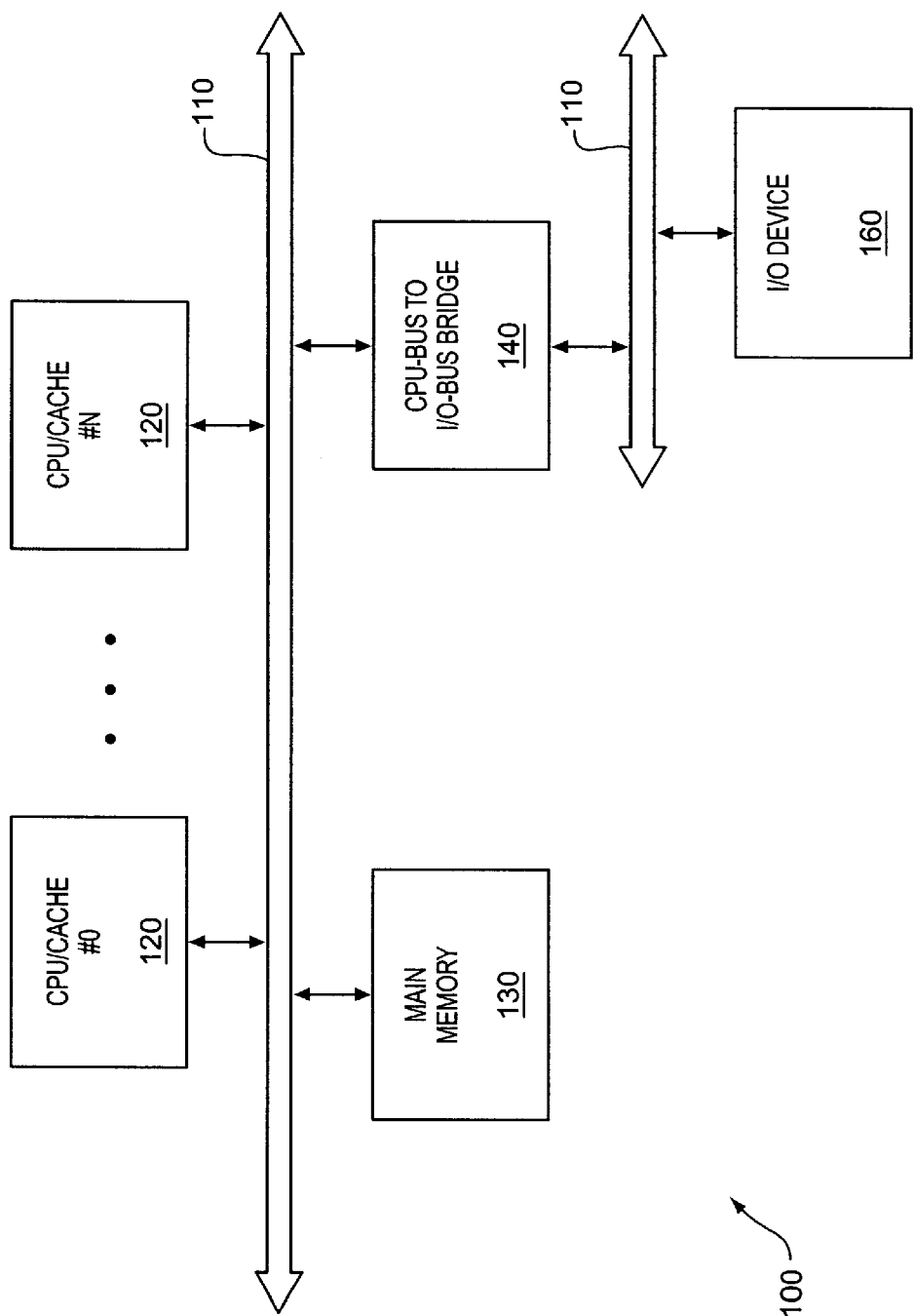
FIG. 1 is a drawing of a prior-art generic symmetric shared-memory multiprocessor system using a shared-bus.
Figure 2:
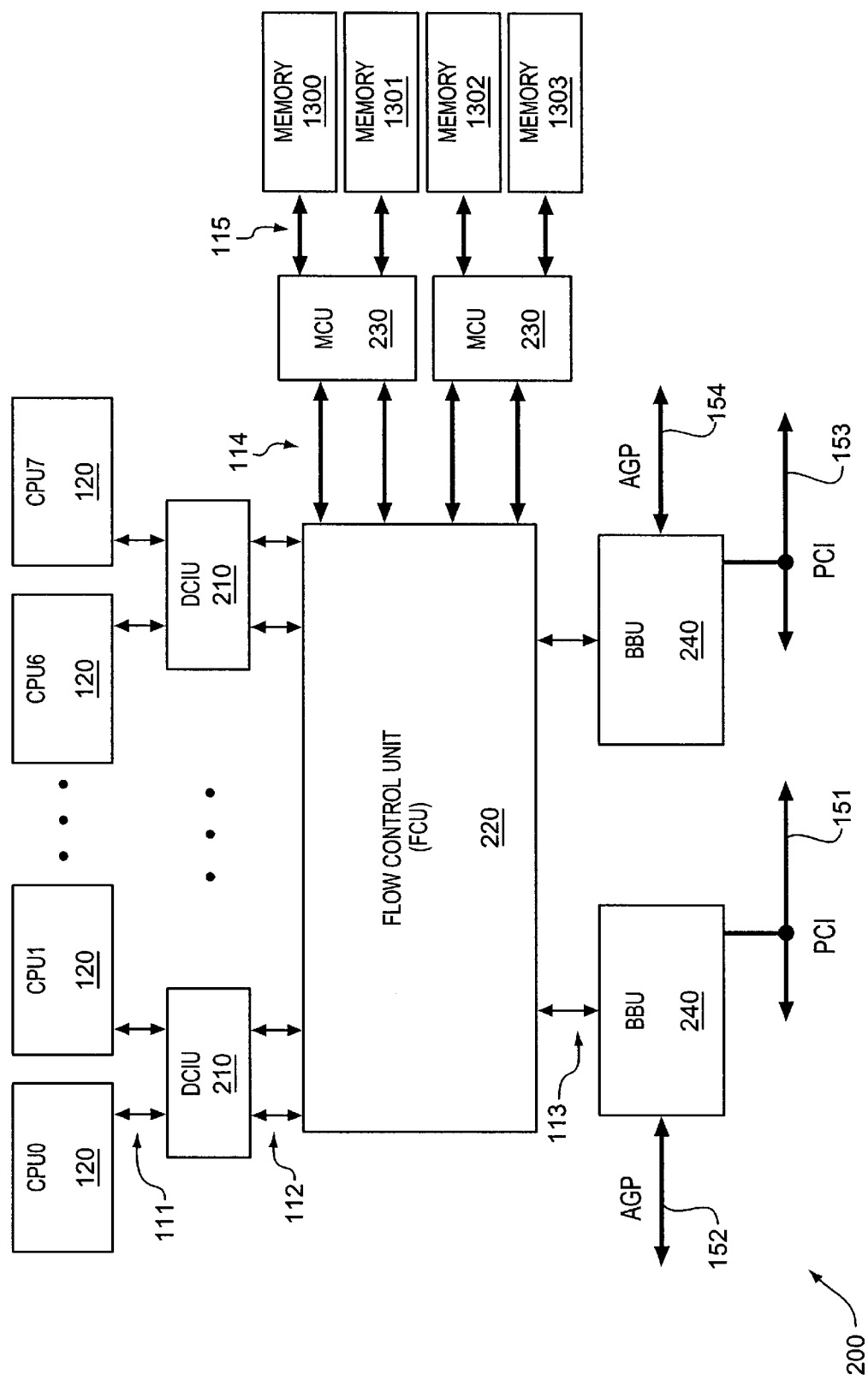
FIG. 2 is a drawing of a preferred embodiment symmetric shared-memory multiprocessor system using a switched fabric data path architecture centered on a Flow-Control Unit (FCU).

System Overview. FIG. 2 is a drawing of a preferred embodiment symmetric shared-memory multiprocessor system using a switched fabric data path architecture centered on a Flow-Control Unit (FCU) 220. In the illustrated embodiment, eight processors 120 are used and the configuration is referred herein as an "8P" system.

The FCU (Flow Control Unit) 220 chip is the central core of the 8P system. The FCU internally implements a switched-fabric data path architecture. Point-to-Point (PP) interconnect 112, 113, and 114 and an associated protocol define dedicated communication channels for all FCU I/O. The terms Channels and PP-Channel are references to the FCU's PP I/0. The FCU provides Point-to-Point Channel interfaces to up to ten Bus Bridge Units (BBUs) 240 and/or CPU Interface Units (CIUs) and one to four Memory Control Units (MCUs) 230. Two of the ten Channels are fixed to connect to BBUs. The other eight Channels can connect to either BBUs or CIUs. In an illustrative embodiment the number of CIUs is eight. The CIUs are preferably packaged as a pair referred herein as a Dual CPU Interface Unit (DCIU) 210. In the 8P system shown, the Dual CPU Interface Unit (DCIU) 210 interfaces two CPUs with the FCU. Thus, the DCIU 210 acts as a protocol converter between the CPU bus protocol and the PP-Channel protocol. Throughout this description, a reference to a "CIU" is understood to describe the logical operation of each half of a DCIU 210 and a references to "CIUs" is understood to apply to an implementation that uses DCIUs 210.

The FCU 210 provides a high-bandwidth and low-latency connection among these components via a Data Switch, also referred herein as a Simultaneous Switched Matrix (SSM), or switched fabric data path. In addition to connecting all of these components, the FCU provides the cache coherency support for the connected BBUs and CIUs via a Transaction Controller and a set of cache-tags duplicating those of the attached CPUs' L2 caches.

All connections between components occur as a series of "transactions." A transaction is a Channel Protocol request command and a corresponding Channel Protocol reply. For example, a processor, via a CIU, can perform a Read request that will be forwarded, via the FCU, to the MCU; the MCU will return a Read reply, via the FCU, back to the same processor. A Transaction Protocol Table (TPT) defines the system-wide behavior of every type of transaction and a Point-to-Point Channel Protocol defines the command format for transactions.

Figure 3:
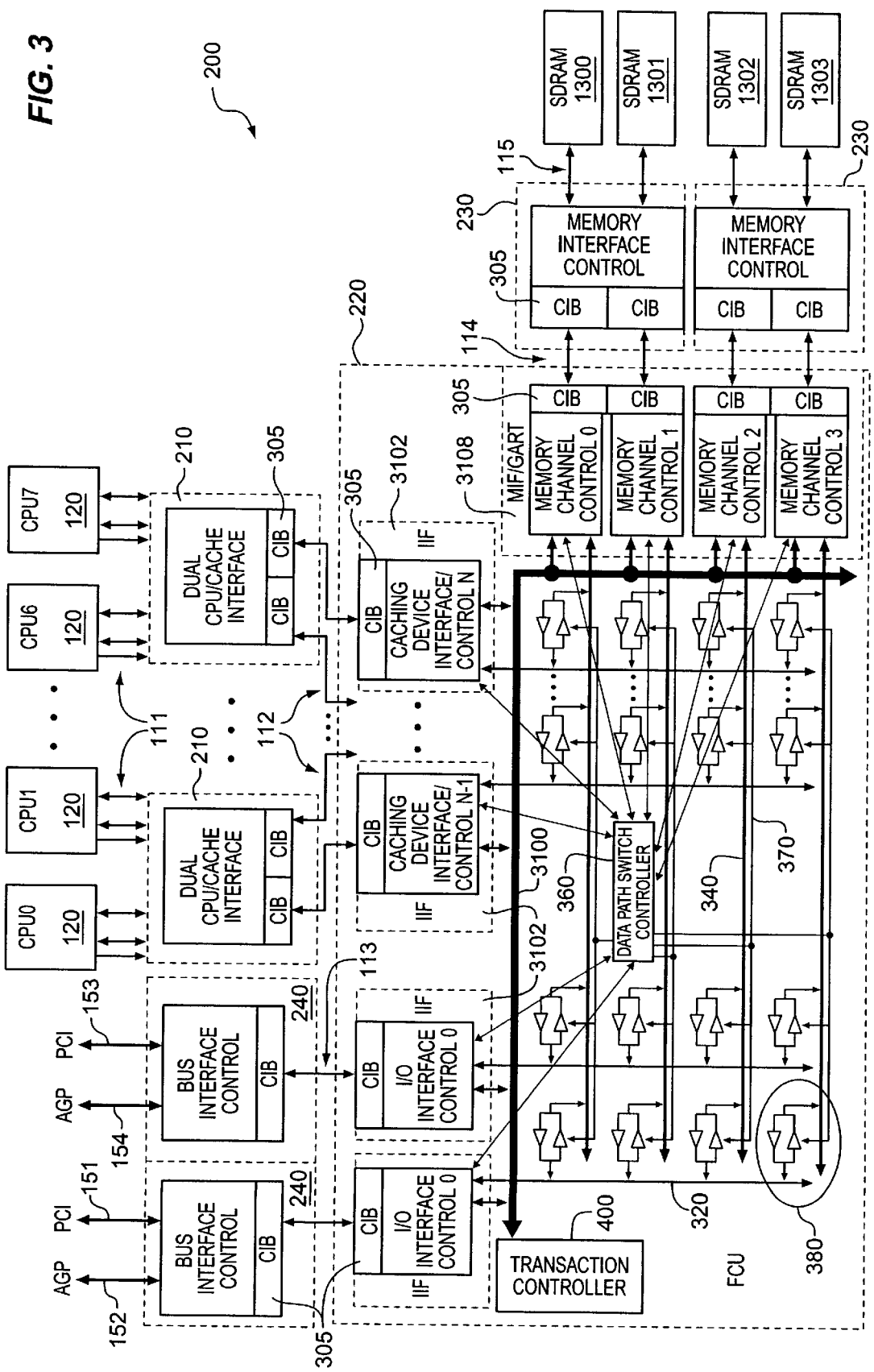
FIG. 3 is a drawing of the switched fabric data path architecture of FIG. 2, further showing internal detail of an FCU having a Transaction Controller (TC), Transaction Bus (TB), and Transaction Status Bus (TSB) according to the present invention.

FIG. 3 is a drawing showing internal detail of the switched fabric data path architecture within the FCU of FIG. 2. A first key component of the FCU is the Transaction Controller (TC) 400. A second key component of the FCU is an address and control bus 3100, that is actually an abstraction representing a Transaction Bus (TB) 3104 and Transaction Status Bus (TSB) 3106. A third key component of the FCU is the Data Path Switch (also referred herein as the Data Switch, or the switched fabric data path). The Data Switch is composed of vertical buses 320, horizontal buses 340, node switches 380. The node switches selectively couple the vertical and horizontal buses under control of the Data Path Switch Controller 360 and control signals 370. Additional key components of the FCU include one or more Initiator Interfaces (HIFs) 3102; a Memory Interface (MIF) 3108; and Channel Interface Blocks (CIBs) 305 at the periphery of the various interfaces.

Figure 4A:
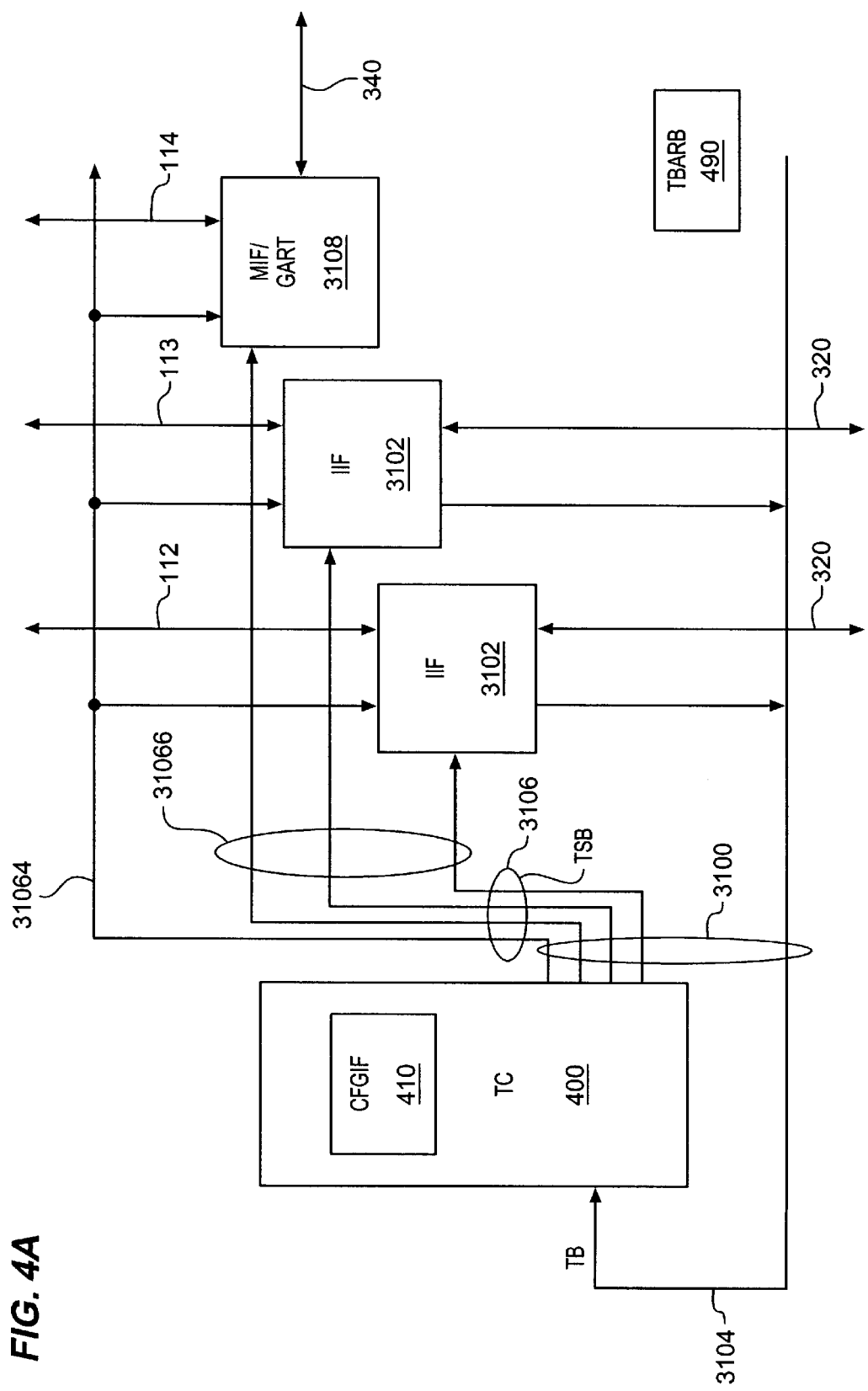
FIG. 4A is a drawing illustrating system serialization accomplished via the signal flow through the TB, TC, TSB and the Initiator Interfaces (IIFs) and Memory Interfaces (MIFs) of FIG. 3.
Figure 4B:
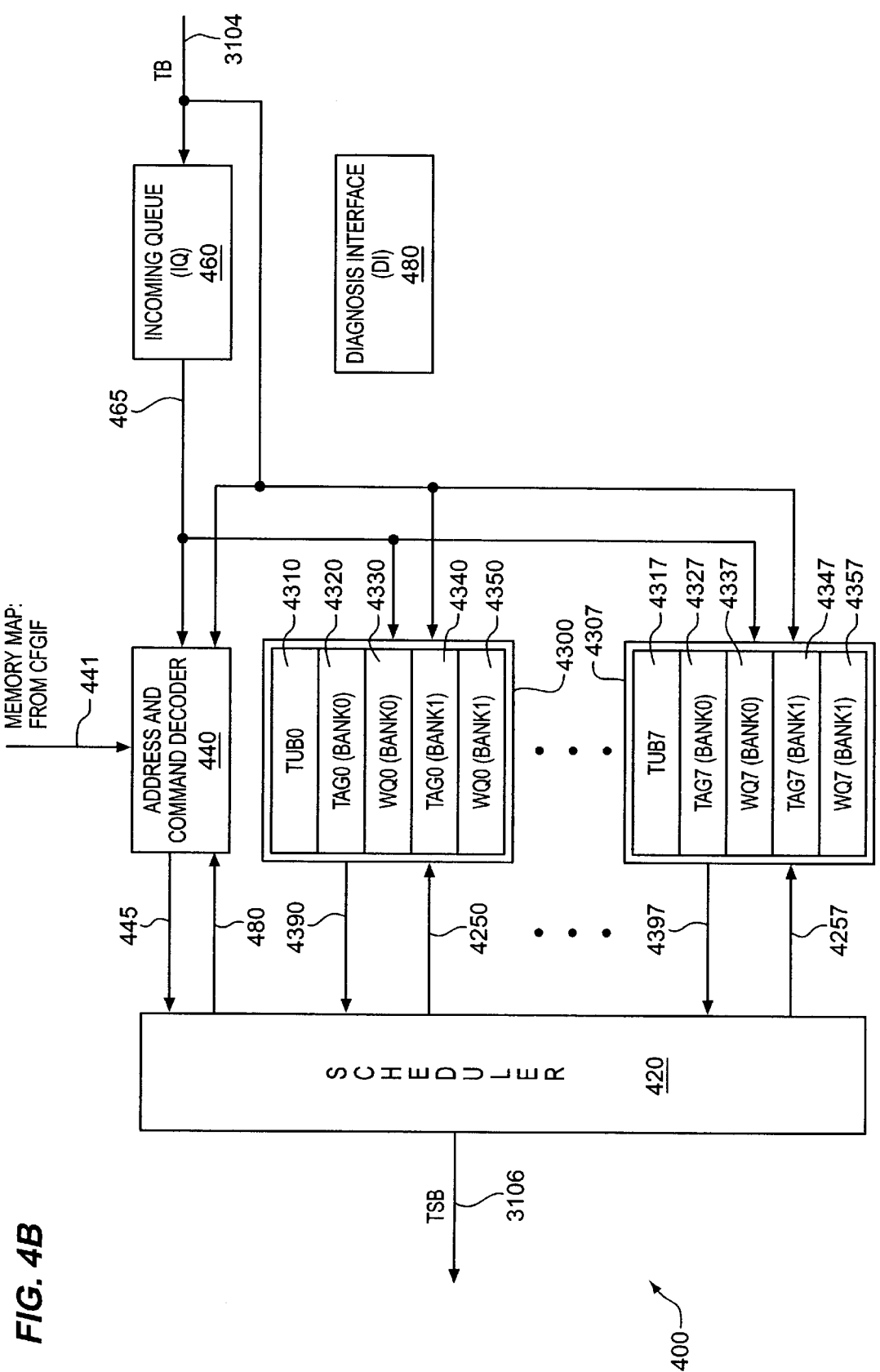
FIG. 4B is a drawing showing internal functional relationships of the TC of FIG. 3.
Figure 4C:
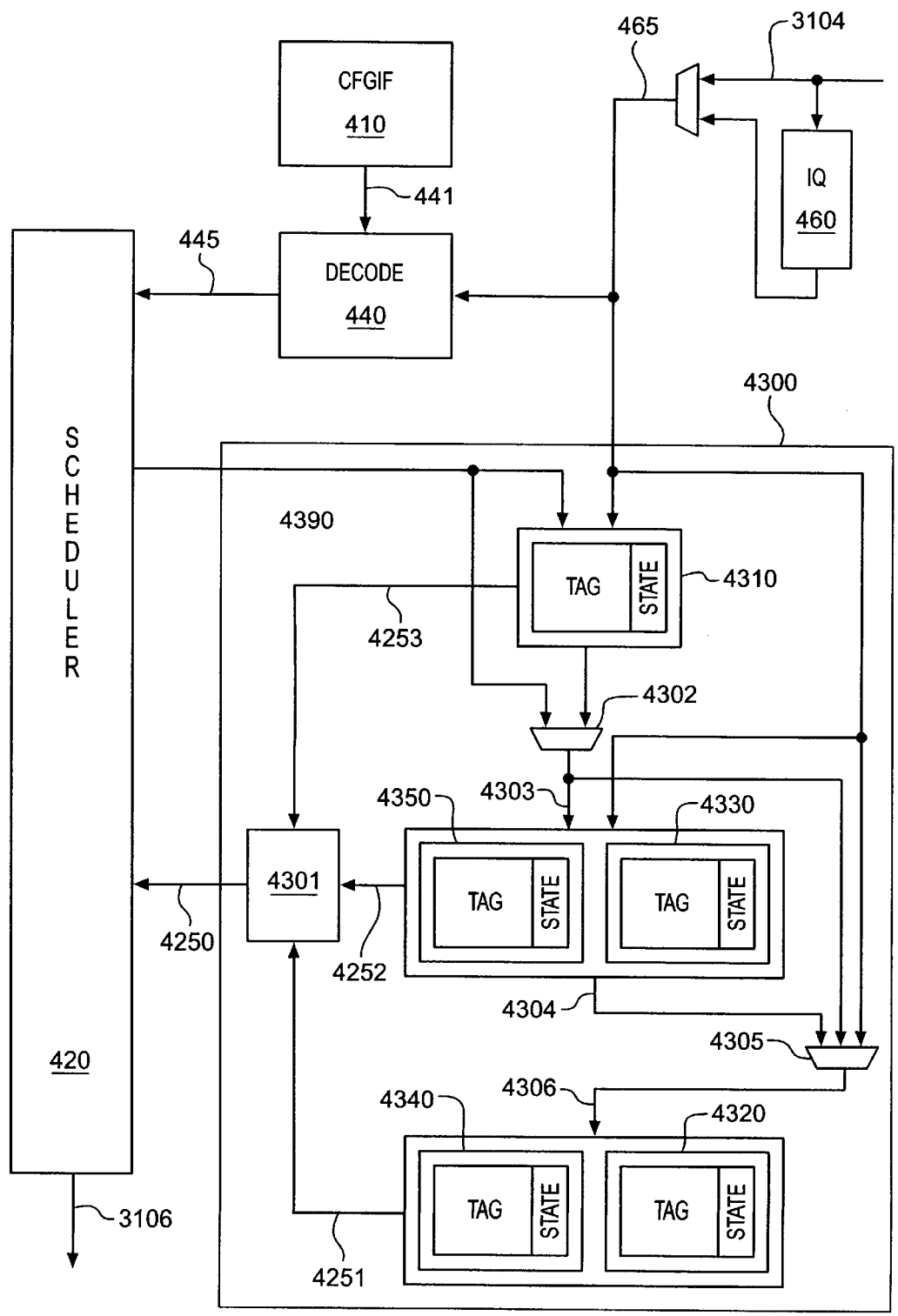
FIG. 4C is a drawing showing internal signal flow detail for one of the duplicate cache-tag modules within TC.

FIG. 4A is a drawing illustrating the signal flow through the TB, TC, TSB and the Initiator Interfaces (IIIFs) and Memory Interfaces (MIFs) of FIG. 3. FIG. 4B is a drawing showing internal functional relationships of the TC of FIG. 3. FIG. 4C is a drawing showing internal signal flow detail for one of the duplicate cache-tag modules within TC.

Transaction Controller (TC) 400. The TC acts as a system-serialization point, a necessary concept in a cache coherent system. All requests, cacheable or not, pass through the Transaction Controller. The TC handles the cache coherency protocol using a duplicate set of L2 cache-tags for each CPU. It also controls address mapping inside the FCU, dispatching each transaction request to the appropriate target interface.

Transaction Bus (TB) 3104 and Transaction Status Bus (TSB) 3106. All request commands flow through the Transaction Bus. The Transaction Bus is designed to provide fair arbitration between all transaction sources (initiators) and the TC; it provides an inbound path to the TC, and distributes outbound status from the TC (via a Transaction Status Bus).

Switched Fabric Data Path (or Data Switch). All reply commands (some with data) flow through the Data Switch. The Data Switch is designed to let multiple, simultaneous data transfers take place to/from initiators and from/to targets (destinations of transactions). Note that the Data Switch is packet based. Every transfer over the Data Switch starts with a Channel Protocol command (playing the role of a packet header) and is followed by zero or more data cycles (the packet payload). Both write requests and read replies will have data cycles. Other replies also use the Data Switch and will only send a command header (no payload).

IIF (Initiator InterFace) 3102. The IIF is the interface between the FCU and an initiator (a BBU or a CIU). The IIF transfers Channel Protocol commands to and from the initiator. The IIF must understand the cache coherency protocol and must be able to track all outstanding transactions. Note that the BBU/CIU can be both an initiator of commands and a target of commands (for CSR read/write if nothing else). Address and control buffering happen in the IIF; bulk data buffering is preferably done in the BBU/CIU (in order to save space in the FCU, which has ten copies of the IEF). The IF needs configuration for CPU and I/O modes, and to handle differences between multiple types of processors that may be used in different system configurations.

Memory Interface (MIF) 3108. The MIF is the interface between the rest of the chipset and the MCU(s). The MIF is the interpreter/filter/parser that sits between the Transaction Controller and the MCU chip(s), and between the MCU chip(s) and the Data Switch. It is a "slave" device in that it can never be an initiator on the TB. (The MIF is an initiator in another sense, in that it sources data to the Data Switch.) There is one MIF (regardless of how many memory interfaces there are). The MIF needs configuration for memory banking/interleaving. It also contains the GART (Graphics Address Remap Table).

Configuration Register Interface (CFGIF) 410. This is where all the FCU's Control and Status Registers (CSRs)

logically reside. CFGIF is responsible for the reading and writing of all the CSRs in the FCU, as well as all of the diagnostic reads/writes (e.g., diagnostic accesses to the duplicate tag RAM).

Channel Interface Block (CIB). The CIBs are the transmit and receive interface for the Channel connections to and from the FCU. The FCU has 14 copies of the CIB, 10 for BBUs/CIUs, and 4 for MCUs. (The CIB is generic, but the logic on the core-side of the Channel is an HIF or the IIIF.) The Channel is described by FIGS. 11A trough 11H, which detail Point-to-Point Channel (PP-Channel) definitions.

System-Serialization Point. The most critical coherency principle obeyed by the FCU is the concept of a single, system-serialization point. The system-serialization point is the "funnel" through which all transactions must pass. By guaranteeing that all transactions pass through the system-serialization point, a precise order of transactions can be defined. (And this in turn implies a precise order of tag state changes.)

In the FCU, the system-serialization point is the Transaction Controller (TC). Coherency state is maintained by the duplicate set of processor L2 cache-tags stored in the TC.

When a request reaches the system-serialization point, it may update the duplicate tags in the Transaction Controller. Changes in other parts of the system may lag the TC's update of the duplicate tags. For example, a probe may take many cycles to reach a CPU and affect its cache-tags. However, the system as a whole must behave as if the tags have been updated instantly at the system-serialization point. This is possible because all requests must funnel through the system-serialization point, and hence all requests see a uniform tag state at that point.

One issue with this approach is the problem of simultaneous transactions involving the same cache-tag. E.g., a tag update (probe) sent out from the TC and going upstream to a CPU might pass a request for the same cache-line going downstream. The tag update has, in a very real sense, already happened. When the CPU's request gets to the TC, it must see the new state of the tags. Note, for example, that the CPU's request could be a "*2M" (change any (*) state to (2) modified (M)) request for a line that it no longer has (because a probe could be on its way to the CPU to evict that line). The TC must handle these cases by detecting (and failing or killing) "unexpected" commands (e.g., a writeback for a line that is now invalid).

Transaction Protocol Table (TPT). The Transaction Protocol Table (TPT) is the system's cache coherency algorithm, based on the PP-Channel definitions and the switched fabric data path architecture. The TPT defines how all the parts of the FCU (and the chipset as a whole) cooperate to perform transactions. The TPT specifies the behavior of the TC and of the system in response to requests of any type from any initiator.

The TPT also defines a set of Ordering Rules governing when transactions can pass each other. The FCU uses these Ordering Rules to optimize transaction throughput (by letting transactions bypass stalled transactions, where permitted).

Example of Transaction Flow. FIGS. 9A and 9B illustrate an example Transaction Protocol Table for the case of a block read operation. This serves as an example of the data flow in the chipset. It shows how a simple cacheable read transaction flows from the CPU to DRAM and back. (Note that it assumes that Channel crossings take three full cycles in each direction.) Clock cycles where the transaction is in the FCU are marked with an asterisk. (This only follows the command cycles that are in the FCU, not the subsequent data cycles.)

All Channel Protocol request commands (except for some probe-induced writeback requests) must go over the TB and TSB. For requests without data (non-writes), this is all that is needed as the target of the request gets "invoked" via the TSB. For requests with data, the initiator must arbitrate for the Data Switch and send the full packet (the Channel Protocol command "header" which was sent on the TB plus the data "payload") to the target. This means that for write requests, the target does not have to remember any information from the TSB (it can wait for the command and data to be sent over the Data Switch).

Addressing. The FCU assumes that initiators have converted addresses from other formats to conform with the PP-Channel definitions. The FCU does do target detection. Specifically, the FCU determines the correspondence between addresses and specific targets via address mapping tables. Note that this mapping hardware (contained in the CFGIF and the TC) maps from Channel Protocol addresses to targets. The mapping generally does not change or permute addresses.

The FCU modifies addresses in one case only. The MIF may modify addresses in order to interleave data among different MCUs. If the MIF didn't modify addresses, then each MCU would have to understand the memory interleaving and know which address bits to ignore. It turns out that the FCU has plenty of time to do this mapping (between when the MIF sees the transactions on the TB until the transaction is past the backoff point), whereas this would be a critical path in the MCU.

Transaction Bus and Transaction Status Bus. The Transaction Bus (TB) is the address/control "highway" in the FCU. It includes an arbiter and the Transaction Bus itself. The TB pipelines the address over two cycles. The extent of pipelining is intended to support operation of the FCU at 200 MHz using contemporary fabrication technology at the time of filing of this disclosure.

Whereas the TB provides inputs to the Transaction Controller, the Transaction Status Bus delivers outputs from the Transaction Controller to each interface and/or target. The TSB outputs provide transaction confirmation, coherency state update information, etc. Note that while many signals on the TSB are common, the TC does drive unique status information (such as cache-state) to each interface. The Transaction Bus and Transaction Status Bus are discussed in detail later in this application.

Transaction Controller. The Transaction Controller (TC) acts as central system-serialization point for coherency control and ensures that all transactions in the system happen in a defined order, obeying defined rules. All transactions without exception are required to pass through the Transaction Controller. The Transaction Controller is discussed in detail later in this application.

Switched Fabric Data Path (Data Switch). The Data Switch is an implementation of a Simultaneous Switched Matrix (SSM) or switched fabric data path architecture. It provides for parallel routing of transaction data between multiple initiators and multiple targets.

Memory Interface (MIF). The Memory Interface (MIF) is the portal to the memory system. It receives transaction status from the TB and TC, issues requests to the MCU, receives replies from the MCU, and forwards the replies to the initiator of the transaction. For higher performance, the MIF supports speculative reads. Speculative reads start the read process early using the data from the TB rather than waiting for the data on the TSB. The MIF contains the memory mapping logic that determines the relationship between addresses and MCUs (and memory ports). The MIF also contains the GART (Graphics Address Remap Table). Addresses that hit in the GART region of memory will be mapped by the GART to the proper physical address.

U.S. application Ser. No. 08/986,430, AN APPARATUS AND METHOD FOR A CAHCE COHERENT SHARED MEMORY MULTIPROCESSING SYSTEM, filed Dec. 7, 1997, is hereby incorporated by reference. Application Ser. No. 08/986,430 provides additional detail of the overall operation of the systems of FIGS. 2 and 3. To the extent to which any discrepancies exist between the descriptions, the instant application should take priority in resolving such discrepancies as it provides architectural improvements and referred embodiments not known at the time of the filing of the earlier application.

TRANSACTION CONTROLLER

The Transaction Controller (TC) 400 is central to the operation of the FCU 220. It latches address and command data from the Transaction Bus (TB) 3104, performs FCU duplicate cache-tag and FCU memory map looks-ups, calculates cache-state transitions according to the selected MESI or MOESI protocol, and determines the targets of the current transaction. A MESI protocol implements the Modified, Exclusive, Shared, Invalid States (MESI). A MOESI protocol implements the Modified, Owned, Exclusive, Shared, Invalid States (MOESI). The transaction status and control information is driven out onto the Transaction Status Bus (TSB) 3106.

The TC 400 (in conjunction with the TB 3104) acts as the system serialization point, by defining the relative order of transactions in the system and helping to ensure that order. All transactions on the TB 3104 except LOCKOFF and AddrBoffResume are required to pass through the TC 400.

The TC 400 runs in a pipelined-fashion and maintains strong transaction order. TC 400 latches transactions appearing on the TB 3104, processes them, and then drives corresponding transaction status and control information onto the TSB 3106 in the same order as the transactions appeared on the TB 3104. The TC 400 does not permit transaction reordering.

The TC 400 employs a duplicate cache-tag (TAG) (4320, 4321, 4322, . . . 4327 and 4340, 4341, 4342, . . . 4347 in FIG. 4B) and TAG Update Buffer (TUB) (4310, 4311, 4312, . . . 4317 in FIG. 4B) to follow the MOESI/MESI state and the ownership of each cache-line in the system. The cache-state of each cache-line can only be explicitly updated by transactions coming in from the TB.

The TC uses single-port SRAM as its TAG duplicates. To utilize the TAG bandwidth more efficiently, a corresponding Write Queue (WQ) (4330, 4331, 4332, . . . 4337 and 4350, 4351, 4352, . . . 4357 in FIG. 4B) is used for updating each TAG. For each TAG, updates are only permitted when the TAG's is not being accessed from a TB transaction, or when the TAG's associated WQ is full. To increase the effective bandwidth of the TAG, the TAG is implemented as two physical banks of SRAM (Bank0 and Bank1). This permits a TAG access from a TB transaction and a TAG update from the WQ to be carried out at the same time, provided they each address a different one of the two SRAM banks. The use of the two banks is a distinct feature different from the organization of the TAGs into two associative sets.

The TC uses system memory map information from the Multiprocessor-Chipset Configuration Registers provided via the FCU's Configuration Register Interface (CFGIF) 441 to decode the incoming transactions and thereby determine the targets specified by a transaction appearing on the TB. For diagnosis purpose, the processors can access the duplicate TAG by reading or writing into an FCU diagnosis space.

Transaction Controller Features Summary. The TC of the preferred embodiment supports the following features:

operation according to either the MESI or MOESI protocol;

native execution of PP-Channel command definitions, which are comprehensive enough to indirectly implement commands for multiple processor and bus types;

a 39-bit address space and a 35-bit address for TAG; tag-sectoring (using 2 cache-lines per sector);

executes transactions according to the sequential states predefined for the entire system (the sequential state behavior of the system for major transaction types is specified in a table referred herein as the Transaction Protocol Table (TPT));

pipeline operation at a rate of 200M transactions per second at 200 MHz;

operation with speculative devices (such as MIF) and non-speculative devices (such as IIF);

2-way set-associated or direct-mapped L2 caches from 512 KB to 4 MB; banked TAG (two banks) for hiding TAG updates;

diagnostic accesses to TAG SRAM through a diagnosis address space;

a TUB to fully follow the ownership of cache-lines; and a WQ to efficiently utilize the TAG bandwidth.

Transaction Controller Operation. The major functional blocks of TC 400 are shown in FIG. 4B. These functional blocks are the Incoming Queue (IQ) 460, Tag Update Buffers (TUBs) (4310, 4311, 4312, . . . 4317), duplicate TAG SRAMs (TAGs) (4320, 4321, 4322, . . . 4327 and 4340, 4341, 4342, . . . 4347), Write Queues (WQs) (4330, 4331, 4332, . . . 4337 and 4350, 4351, 4352, . . . 4357), a Scheduler 420 and the Diagnosis Read/Write Interface (Diagnosis Interface, DI) 480.

FIG. 4C details the functional relationship between the various blocks associated with managing the duplicate cache-tags corresponding to the first L2 (L20) associated with CPU0. Collectively these blocks are identified by callout 4300. TB derived signal 465 is directly coupled to snoop (lookup) ports on the TUB0 4310 and the WQ0 (Bank0) 4330 and WQ0(Bank1) 4350. TB derived signal 465 also may be selected by mux 4305 to perform a cache-tag look up of TAG0(Bank0) 4320 and TAG0(Bank1) 4340 via interconnect 4306. Signals 4251, 4252, and 4253 provide hit/miss information and cache-tags on hits for the TUB, WQs, and TAGs, respectively. These three signal groups are coupled to priority logic 4301, which for multiple hits on the same cache-line will select the one of the three signal groups that corresponds to the most recent cache-tag update. Specifically, the TUB holds entries more recent than the WQs, which hold more recent entries than the TAGs. The selected signal group is then used as overall lookup status 4250 for input to the Scheduler 420. The TUB0 4310 is written by the scheduler 420 via signal 4390. Writes 4303 to the WQ0(Bank0) 4330 and WQ0(Bank1) 4350 come from either the TUB0 4310 or the Scheduler 420 as selected by mux 4302. The TAG0(Bank0) 4320 and TAG0(Bank1) 4340 can be written by interconnect 4306 from either WQ output 4304 or mux 4302 output 4303 as selected by mux 4305.

There is one IQ 460 for the entire TC. The IQ operates according to a FIFO protocol, and the IQ may be implemented in any of the many functional FIFO equivalents known in the art. The IQ is used to temporarily store the incoming transactions from the TB when the following stages are blocked. IQ directly latches transactions from the TB. Due to the tight TB timing, it is recommended that no logic be placed between TB and the IQ.

The Address and Command Decoder 440 functional unit decodes incoming transactions on interconnect 465 as selected from either the IQ 460 output or the TB 3104. The contents of memory map registers loaded from information provided by the CFGIF 410 are used to determine the target functional unit of the system corresponding to the address of each TB transaction. A pair of memory map registers defines the address windows for each target functional unit. One register establishes the base address for the window while the second register establishes the size of the window. The Address and Command Decoder 440 also decodes the command of each TB transaction into an internal pre-decode format for easier processing by the Scheduler 420. In addition to memory access commands, other operations are decoded from the incoming transactions. Decode operations include: x86 specials transactions, memory mapped PCI configuration transactions, x86 I/O transaction, Multiprocessor-Chipset Configuration Register access transactions, AGP accesses, and GART accesses. The scheduler uses the decoded information from the Address and Command Decoder in conjunction with the information coming from the TUBs, WQs and duplicate TAGs, to determine cache-state transitions. The output 445 of Decoder 440 includes the decoded information, the target functional unit information, and the address and command information from the TB.

In the context of the description of the TC, unless further qualified, the term TAG generically refers to a modular TC logic block for holding a set of (duplicate) cache-tags. There is one (2-bank) TAG logic block within the TC for each CPU/Cache module. In the following discussion, a reference to "L2 cache" should be construed as a reference to the highest-level cache of the CPU/Cache modules 120. In the preferred embodiment that highest-level of cache is presently an L2 cache.

Each TAG holds duplicate cache-tags that mirror the L2 cache-tags in the L2 cache of its corresponding CPU. Just as in the primary L2 cache-tags, a cache-tag exists corresponding to each L2 cache-line. The tags include address and state fields. The address field holds the tag address. (The tag address is a partial address, which in conjunction with the cache-line size, index, and sectoring (when present), is sufficient to identify uniquely the main memory location corresponding to the data held in the corresponding cache-line.) The state field holds the state of the cache-line in accordance with the desired MESI/MOSEI protocol.

The TAGs act like probe filters. For probes from other processors, instead of sending the probe to each L2 every time, the duplicate cache-tags within the TC are probed first. This reduces the probes sent to the L2s to those that are absolutely necessary to perform cache-state transitions and/ or to write back dirty cache-lines. To increase the effective bandwidth of the duplicate cache-tags, each TAG is divided into two separate banks, such that two banks can be accessed at the same time by two different sources. In the TC, the most likely case is that while one bank is being looked up by the incoming TB transaction, the other bank is being updated by the WQ. In FIG. 4B, TAG0(Bank0) 4320 is the Bank0 TAG for the first L2 and TAG0(Bank1) 4340 is the Bank1 TAG for the first L2. TAG0(Bank0), TAG0(Bank1), TAG1 (Bank0), TAG1(Bank1), . . . , TAG7(Bank0) 4327, TAG7 (Bank1) 4347 correspond to the eight possible L2s in the system.

Whenever there is cache-state transition, the TC needs to update the corresponding duplicate cache-tag within the TAGs with the new state. Since each TAG is implemented as single-port SRAM, and although each TAG is already banked to allow simultaneous update and lookup to the two different banks, without additional buffering it is still possible that updates might block simultaneous lookups arising from transactions on the TB. To insure that the TAGs are non-blocking, a Write Queue (WQ) is further provided for each bank of every TAG. The WQs increase the efficient use of each TAG by increasing access utilization (maximizing the exploitation of TAG access opportunities). The WQs act as Delay Update Queues, in the sense that the updates of each TAG are delayed and queued in the corresponding WQs, while waiting for idle cycles on the TB.

There is a TAG Update Buffer (TUB) (4310, 4311, 4312, . . . 4317) associated with each TAG and thereby associated with a particular L2. Each TUB is used to temporarily queue L2 cache-tags for cacheable reads associated with the TUB's particular L2, before updating the corresponding entries within the TUB's associated TAG. Consider a cacheable read R that maps into an L2 cache-line entry E. The L2 cache-tag associated with entry E needs to be updated with the tag address and cache-state information for the line being read. However, entry E may be already holding a valid cache-line for a different location in main memory. In this case, the cacheable read causes a read miss that requires replacement of one-way of the existing cache-line entry E. Generally, the TC has no means to know which of the ways of entry E will be replaced in the L2. As a result, before TC can update its duplicate cache-tag for entry E, it awaits a transaction from the L2 invalidating the specific way of the existing cache-line (after being written back to main memory, if dirty) from the L2. When the transaction is sent by the L2, it will have already updated its own copy of the cache-tag to reflect the cacheable read.

Thus because of the cacheable read, if an existing valid L2 cache-line entry E is in the E or S State, the L2 will update its entry E and the associated cache-tag to reflect the cacheable read. The L2 also sends a transaction over the TB to invalidate the previous cache-line. Conversely, if the existing valid L2 cache-line is found in the M or O State, before the L2 sends the transaction to invalidate the line, the L2 will first write back the cache-line to main memory. In both cases, the TC uses the invalidating transaction to identify the way of the cache-line E that was replaced. The TC is then able to update its duplicate cache-tag corresponding to the entry E to mirror that of the L2 cache.

Subsequent to the cacheable read R and prior to the invalidation of one of the existing valid cache-line ways by the L2, the cache-tag associated with the cacheable read R will be held pending. During this interval, the TC keeps the existing cache-tag for both ways of entry E untouched within the TAG associated with the particular L2 of interest, and temporarily keeps the new cache-tag (with the new cache-line tag address and state) for the cacheable read R in the associated TUB. Each TUB snoops the incoming TB transactions and updates the appropriate cache-tag in its associated TAG when an L2 transaction signals the invalidation of the particular existing cache-line way at entry E. A more detailed description of TUB operation, including details for various TAG configurations and details of the cache-line replacement-policy, is included below.

Each TUB has 16 entries, capable of holding 16 pending cacheable reads. All initiators capable of initiating cacheable reads keep a counter to track the number of outstanding cacheable reads. The counter is increased by one when a cacheable read is sent on to the TB (and to the TC) and decreased by one when the read—release signal from the TC is sampled asserted by one cycle. TC asserts read—release signal for one cycle whenever a TUB entry is freed. At any time, the number of cacheable reads pending within each initiator can not be greater than 16.

The TC has a Scheduler 420. The Scheduler uses TAG lookup outputs, decoded address and command as inputs and drives various internal control and cache-state signals. For each transaction, the scheduler calculates the cache-state transitions for the transaction, calculates the targets of the transaction and drives control signals to update the appropriate TAG. The Scheduler also drives TSB signals to each FCU IFs. The cache-state of the system is implied by the TSB commands output by the scheduler to the IFs. As shown in FIG. 4A, The TSB 3106 signals driven by the Scheduler 420 are composed of a shared interconnects 31064 and individual point-to-point interconnects 31066 for each IIF 3102 and the MIF 3108. FIGS. 13A and 13B list and describe the shared interconnects 31064. FIG. 13C through 13E, list and describe the point-to-point interconnects 31066.

The TC internal TAG SRAM and TUBs can be accessed by Multiprocessor-Chipset Configuration Register access transactions. DI is the interface for such diagnostic accesses.

For each Multiprocessor-Chipset Configuration Register Transaction, the DI stops TC's internal pipeline, flushes the WQ when necessary and performs the requested read/write operation with the TAG or TUB.

Transaction Controller Operating Modes and Tag RAM Organization. TC can be configured to run in one of the three modes (A, B, and C), corresponding to three distinct processors. FIG. 5 lists the L2 configuration and TC TAG organizations for these three modes. Note that the TC's duplicate TAGs are always implemented with a 2-way set-associative configuration while the supported L2 configurations could either be direct-map or 2-way set- associative. Each TC duplicate TAG is implemented as single-port on-chip SRAM. Each TAG is divided into two banks to increase its effective bandwidth.

Figures 6A, 6B, 6C:
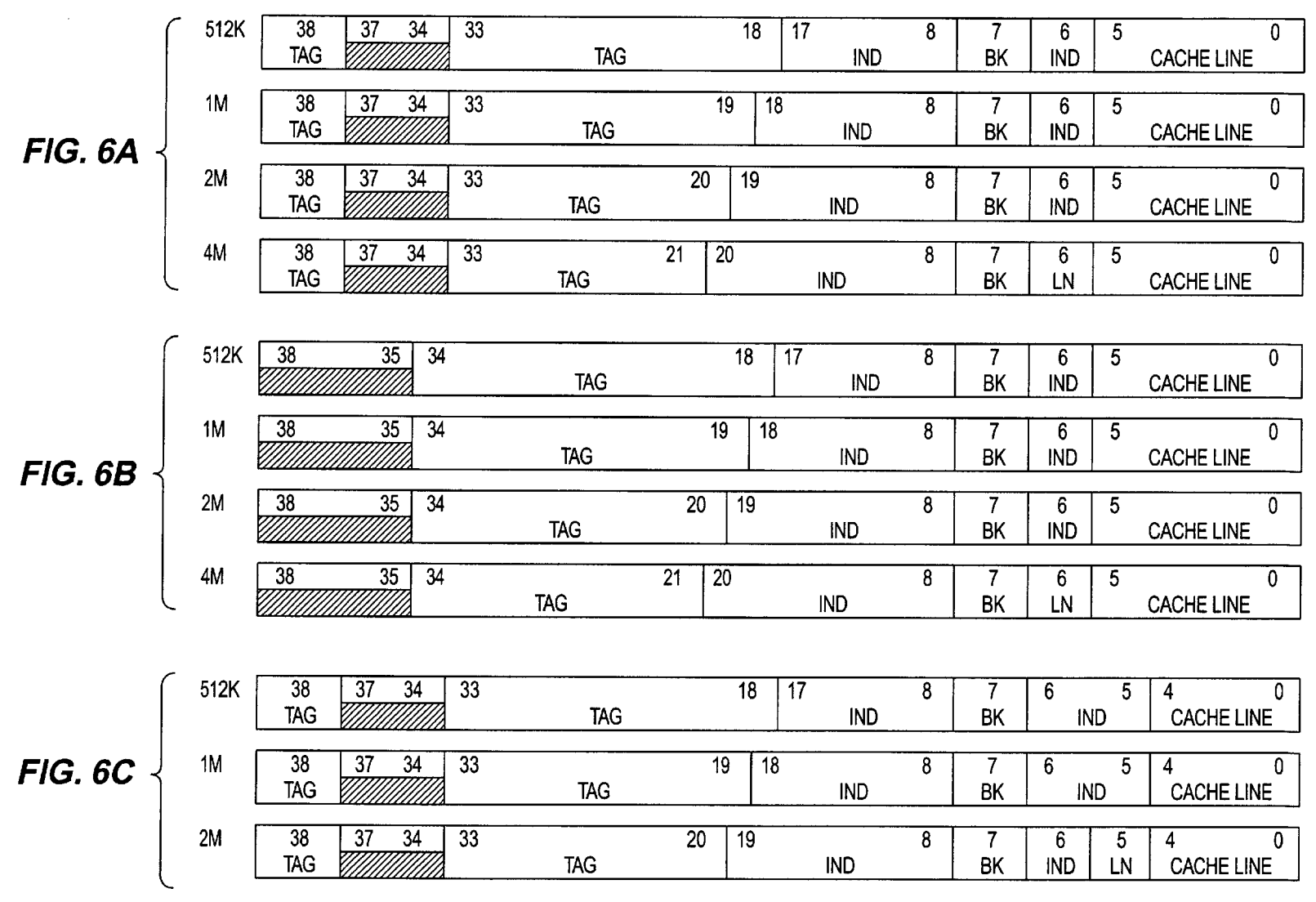
Figure 7A:
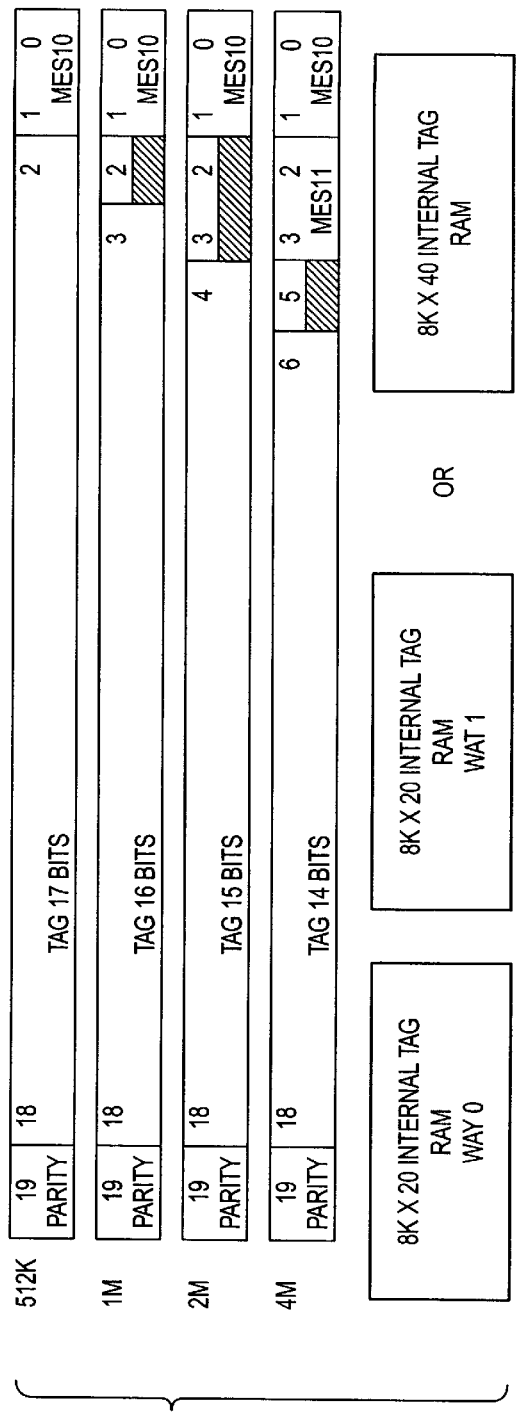
FIGS. 7A and 7B are drawings that illustrate TAG SRAM organizations used in accordance with the operating mode of the preferred TC embodiment.
Figure 7B:
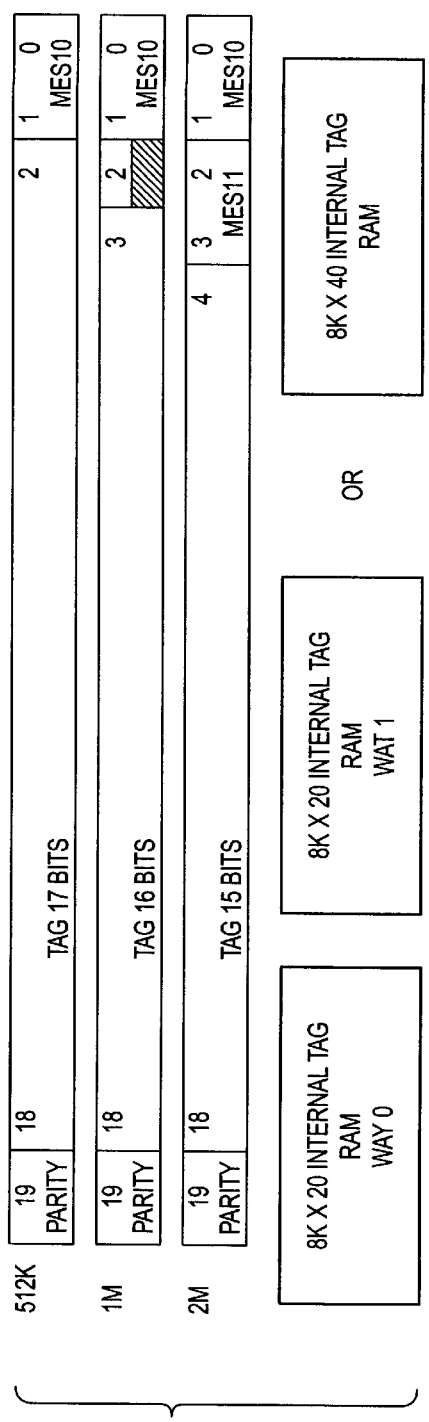

FIGS. 6A, 6B, and 6C are drawings that illustrate three different address mappings respectively used for Mode A, Mode B, and Mode C. For Mode A and Mode B, the TAG SRAM organization of FIG. 7A is used. For Mode C, the TAG SRAM organization of FIG. 7B is used.

Cache-state Encoding. TC and its duplicate TAG support both the MOESI and MESI protocols. The MOESI protocol has five cache-states and typically requires three bits to store the cache-state for a cache-line. However, by encoding the O State by multiple cache-lines, only four states (M, E, S, I) are required to be stored for each cache-line independently. This coding scheme requires only two bits per cache-line. The following coding scheme is used for the cache-tags:

Modified (M)—L2 is the owner of the cache-line. Only one L2 has the line in the M State. (Within the TAGs, the cache-line has a single corresponding cachetag, which is in the M State.)

Owned (O)—L2 is the owner of the cache-line. One L2 has the line in the O State (Within the TAGs, the cache-line has a single corresponding cache-tag in the M State), zero or more L2s also have the line in the S State. (Within the TAGs, the cache-line has a single corresponding cache-tag in the M State, and zero or more corresponding cache-tags in the S State.)

Exclusive (E)—Memory/IO mapped memory is the owner of the cache-line. Only one L2 has the line in E State. (Within the TAGs, the cache-line has a single corresponding cache-tag, which is in the E State.)

Shared (S)—Memory/IO mapped memory is the owner of the cache-line. One or more L2s have the line in S State. (Within the TAGs, the cache-line has one or more corresponding cache-tags in the S State.)

Invalid (I)—Memory/IO mapped memory is the owner of the cache-line. L2s have the line in I State or do not have the line.

TAG Update Buffer (TUB). Each L2 has its own TUB in the TC. Cacheable reads initiated by a L2 may need to allocate an entry in its corresponding TUB to temporarily store cache-state information for the line being read. Other transactions generally do not use the TUB and instead update the TAG SRAM directly. However, the TUB is snooped by all transactions on the TB and the TUB is updated for any transactions that causes a snoop hit. In the illustrated embodiment, each TUB has 16 entries.

Allocation of TUB Entries. If all of the following conditions are true, a TUB entry is allocated and the cacheable read transaction is put into the TUB with the cache-state of the line being read:

the transaction is a cacheable read (the initiating device will cache the data);

an existing valid TAG entry has to be invalidated first before that entry can be updated (replaced) with the new cache-line (for the cacheable read); and the cacheable read transaction has to wait for another TB transaction to invalidate the existing entry (see below).

Non-sectored TAG. In a non-sectored duplicate TAG organization, if one way (or both ways) of the TAG entry to be updated is in the I-State, the way with the I-State (or one of the ways with the I-State) is immediately updated with the cache-state of the line being read. In this case, no entry is allocated in the TAG's associated TUB. If neither way of the TAG entry to be updated is currently in the I-State, an entry is allocated in the TAG's associated TUB and the cacheable read has to wait in the TUB before the appropriate cache-tag can be updated with the new cache-line information. Note that the duplicate TAG is always 2-way associative.

TAG with 2-lines per sector. Suppose S0 and S1 are the two sectors with the same TAG index. S0 is in way0 and S1 is in way1. S0__L0 and S0__L1 are the two lines of sector S0. S1__L0 and S1__L1 are the two lines of sector S1. Assume a cacheable read needs to replace line 0 (L0) of S0 and S1, namely, S0—L0 and S1—L0. Given the foregoing, the TC uses the table of FIG. 8 to decide the appropriate sector to invalidate and whether to allocate a TUB entry. Those skilled in the art will be able to generate the companion table for a replacement of line 1 (L1).

Outstanding Cacheable Read Counter and ts_crd_rel. Each initiator capable of initiating cacheable reads maintains an Outstanding Cacheable Read Counter. The counter is counted up when a cacheable read is issued to the TB. TC drives signal ts_crd_rel to every such initiator. The counter is counted down every time the ts_crd_rel is sampled asserted. TC asserts rs_crd_rel for one cycle in two cases, 1) after processing a cacheable read not requiring TUB entry, 2) release a TUB entry.

When a hardware defined value (let us say 16) is reached by the counter, the initiator should block all the subsequent cacheable reads. However, the initiator must not block any transactions that may free the TUB entries, such as write-back transactions.

TUB Entry Release. The incoming transactions and the TAG lookup status of the incoming transactions are snooped by the TUB. A TUB entry is released when the blocking condition for the cacheable read in that entry is cleared (i.e., the associated L2 cache sent a transaction invalidating the existing line and thereby identifying the particular cache-tag to update).

Ordering of the TUB Entries. An initiator may send multiple cacheable read requests to addresses requiring the same TAG entry. In this case, there may be multiple entries in the TUB waiting for the same TAG entry to be invalidated. The strict order of these requests is maintained. In other words, when a TAG entry is invalidated, all waiting TUB entries are processed strictly in the order they entered the TUB.

The TUB maintains has a flag for each entry to indicate whether that entry is the most recent entry waiting to update a specific TAG entry. The flag is set when a cacheable read accessing a specific TAG entry is entering the TUB. The flag is cleared in two cases:

1) when the TUB entry is not longer the most recent entry (another cacheable read accessing the same TAG entry is entering the TUB);
2) the TUB entry is invalidated. In the second case, the TUB entry is also released.

When a TAG entry is invalidated, the TUB entry with the flag set is used to update the TAG. Note that with all the TUB entries accessing the same TAG entry, at most one entry can possibly has its flag set. In the case that the most recent TUB entry (the entry with the flag set) is invalidated before the TAG is updated (when WRBs go out of order or the TUB entry is invalidated by a RDM from another initiator), no remaining TUB entry accessing the same TAG entry has their flag set. This is not a problem, since all the remaining TUB entries will be eventually invalidated by the initiator.

TUB Snooping. TUB contains the latest cache-state information for the lines being read. The TUB continually snoops for new TB transactions that may hit on older but still pending transactions in the TUB. When there is a hit, the TUB is updated with the latest cache-state.

Write Queue (WQ) and TAG. There is a WQ per L2 per TAG bank. WQ is designed to hide TAG updates from the TB as much as possible. I.e., the WQs generally prevent TB transactions from being blocked by TAG updates.

The updates to the TAG happen in three scenarios:

1) when TB is idle, thus there is no lookup to the TAG from the TB;
2) The TB transaction is targeting one bank of the TAG and leaves the other bank available for updates; and
3) when the WQ is full, updates to the TAG from the WQ take priority and lookups from the TB are blocked.

Logically, WQ should be viewed as an integral part of the TAG. We should not distinguish the updates to the WQ or updates to the TAG. When we say a transaction is updating the TAG, the update may be queued up in the WQ. Since the WQ contains the most up-to-date cache-states for the cache-lines it queued up, the WQ should be snooped on TAG lookups as well. In the illustrated embodiment each WQ has 4 entries.

Transactions and Cache-state Transitions. Cache-state transitions are defined in the Transaction Protocol Table (TPT), a table that specifies the sequential state behavior of the system for major transaction types. The following sections discuss cases that need clarification. Also note that this section applies specifically to Mode A and Mode B processors.

TB Commands. All the PP-Channel commands may appear on the TB. FIGS. 10A and 10B are a table of Transaction Bus commands and their description.

tlock from the TC. The TB bus lock is implemented by TB transactions LOCKON, LOCKOFF and TB signal tlock. The TC has an internal flag called bus lock. The bus lock will be set by a LOCKON transaction if the flag is currently in the clear state. The bus lock flag is cleared either by a LOCKOFF transaction or if the LOCKON transaction setting the flag is backed off. While the bus lock flag is set, the TC will back off all transactions (except LOCKOFF, AddrBoffResume) from other CIUs by asserting tlock. Note that in the case a LOCKON transaction setting the bus lock flag is backed off, the backed off signal for that LOCKON transaction is always seen by the TC at least one cycle before that LOCKON is able to assert tlock. This guarantees the TC will not back off other transactions for a backed off LOCKON.

WRC, BE <> 0xff (Coherent sub-block write). A coherent sub-block write may hit a dirty line in one of the L2s. In this case, the dirty line should be written back to the memory first before the sub-block write can happen. If the TC detects such a case, the initiating IIF of the sub-block write will be given an IIF_AddrBoff command through iif_ctl. The initiating IIF should put the sub-block write into an address back-off state and wait for the AddrBoffResume transaction. The IIF with the dirty line will be given an IIF_WrMInv command through its iif_ctl. Once it has received the IIF_WrMInv command, the IIF with the dirty line should start to back off all transactions accessing the same cache-line. Note that the initiating IIF of the sub-block write should continue to back off transactions until the tsfinish is received for the transaction. This guarantees there is no hole in the procedure of transferring the ownership of the cache-line. Once the dirty line has been written back to the memory, the IIF with the dirty line should send an AddrBoffResume transaction to re-activate the sub-block write.

Timing for Updating the TAG. A TAG entry can be updated (modified) in three cases:

1. Target case. In this case, the TAG entry is modified as the result of a transaction initiated by another IIF. An example is the TAG entry which is currently in S State needs to be invalidated by a E2M transaction initiated by another IIF.
2. Initiator case. In this case, the TAG entry is modified as the result of a transaction initiated by the initiator the TAG entry is associated with. An example is the TAG entry is currently in M State needs to be invalidated by a WRB transaction.
3. Line replacement case. In this case, a existing TAG entry is invalidated as the result of cache-line replacement.

In case 1, the TAG cache transition occurs right after the transaction is processed. A probe will be sent to the IIF to update the L2 cache-line state while the TAG entry is updated with the new cache-line state. All transactions after the transaction updating the cache-line state will see the new state.

In case 2, the TAG cache transition also occurs right after the transaction is processed. All transactions after the transaction updating the cache-line state will see the new state.

In case 3, the line replacement happens in two steps. The first step is to choose which way of the TAG to replace. The details of this have been previously discussed. The second step is to replace the line or the sector (in 2-line per sector configuration). With non-sector configuration, the line being replaced is always invalidated by the initiator, which is actually the same as case 2. With 2-line per sector configuration, the line that is going to be replaced by the initiator will be invalidated the same as case 2. However, the other line that is not going to be replaced by the initiator needs to be invalidated by the TC. The case the other line is in E or S State is treated the same way as case 1. In the case the other line is dirty (M or O State), the line will not be invalidated and updated right away. Instead, the TC will send a probe to the L2 to invalidate and write back the dirty line by a WRB transaction. The WRB transaction then will invalidate the line being replaced, exactly the same as case 2. Note that in case 3, in the case the existing TAG entry is waiting to be invalidated, the new TAG entry is put into TUB. The TAG entry is updated as soon as it is invalidated. In the 2-line per sector configuration, a sector is replaced in the TAG only when both lines in the sector are in I State or being invalidated.

Cache-state Inconsistency. The duplicate TAG within the TC mirrors L2s' TAG. However as described in section 6.7.2, an entry in the duplicate TAG may be updated before the L2 cache-line state is updated by the probe sent from the TC. So there may be cases that a TB transaction has different cache-line state than the duplicate TAG currently has. In such cases, the duplicate TAG is considered to contain the most recent cache-state. This is because that the TC acts as the system-wide serialization point and coherence point. In cases of the inconsistency between duplicate TAG and L2s' TAG, the state transitions and TSB control signals are calculated based on the duplicate TAG cache-line state. The following summarizes all possible inconsistent cases. WRB, BE=0x00. The cache-line in the L2 TAG is currently in E or S State. The possible duplicate TAG cache-line state may be E, S or I. In the case this transaction hits an I line in the duplicate TAG, no state transition and TAG update will occur. IIF_Ack (the regular acknowledge command) is sent back to the initiator through iif_ctl.

WRB, BE=0xff. The cache-line in the L2 TAG is currently in M or O State. The possible duplicate TAG cache-line state may be M, O or I. In the case this transaction hits an I line in the duplicate TAG, no state transition and TAG update will occur. An IIF_Cancel will be sent back to the initiator through iif_ctl to indicate this inconsistency and the initiator will cancel the data transfer associated with this transaction.

E2M. The cache-line in the L2 TAG is currently in E. The possible duplicate TAG cache-line state may be E, S or I. In the case this transaction hits an I line in the duplicate TAG, no state transition and TAG update will occur. An IIF_Cancel will be sent back to the initiator to indicate this inconsistency and the initiator should fail the E2M transaction. In the case this transaction hits an S line, the E2M is changed to an S2M command. All shared copies of the cache-line are invalidated. A regular IIF_Ack is returned to the initiator.

S2M. The cache-line in the L2 TAG is currently in S or O. The possible duplicate TAG cache-line state may be S, O or I. In the case this transaction hits an I line in the duplicate TAG, no state transition and TAG update will occur. An IIF_Cancel will be sent back to the initiator to indicate this inconsistency and the initiator should fail the S2M transaction. WRC, BE<>0xff or BE=0xff. This transaction can be issued by either a cacheable IIF or a non-cacheable IIF:

Cacheable IIF, I State in L2 TAG. No cache-state inconsistency problem.

Non-cacheable IIF, no cache-state inconsistency problem.

TRANSACTION BUS

The Transaction Bus (TB) and Transaction Status Bus (TSB) together provide the address path for the transactions within the Flow Control Unit (FCU). At the beginning of each transaction, the initiating Interface (IF) requests and drives the TB. All other IFs monitor the TB and respond to the transaction according to the type of the IF.

Five types of the FCU functional units are connected to the TB and TSB. They are Transaction Controller (TC), TB Arbitrator (TBARB), Initiator Interface (IIF), Memory Interface (MIF) and the FCU's Configuration Registers Interface (CFGIF) for those Multiprocessor-Chipset Configuration Registers residing in the FCU. IEF is capable of initiating transactions on the TB; while TC, MIF and CFGIF can only act as slaves.

TC is at the center of FCU architecture. It latches address and command from TB, looks-up FCU internal TAG and FCU memory map, uses the transaction address to snoop the duplicate cache-tags, calculates cache-state transitions according to MESI/MOES1 protocol, and determines the targets of the current transaction. The transaction status and control information is driven out on the TSB.

IIF provides FCU interface for both CIU and BBU. When interfacing CIU, IIF acts as a cacheable IF and is able of generating cacheable transactions, while interfacing with BBU, IIF acts as a non-cacheable IF and can only generate non-cacheable transactions. IIF latches the transactions from the TSB and execute any transactions targeting themselves. IIF also compares the TB address and command against their internal Lock Buffer (LB) entries. Any matches that may potentially violate the transaction protocol will be backed-off (Transaction Protocol Table for details).

MIF interfaces with MCU. It latches the address and command from the TB. By decoding the address and command, MWF speculatively sends transactions potentially targeting the host memory to the MCU without waiting for the transaction status to be returned from the TSB. The transaction status from the TSB is merged with the command and data later. MIF also contains GART cache logic to provide the system with AGP support.

CFGIF contains the configuration register file for those Multiprocessor-Chipset Configuration Registers residing in the FCU. The CFGIF controls all the CSRs (Configuration and Status Registers) in the FCU. It is also responsible for handling diagnostic reads and writes. CFGIF latches transactions targeting itself from the TSB and returns or updates the FCU configuration registers accordingly.

TBARB 490 is the TB Arbitrator. It provides fair arbitration for TB requests. FIG. 4A shows TBARB in conjunction with the TB 3104 and the IIFs 3102. FIG. 12B indicates that the IIFs drive requests and other point-to-point IIF-specific control signals on the TB that are received by the TBARB. TBARB in turn drives point-to-point grant signals on the TB that are received by specific IIFs.

TB and TSB Features Summary. The TB and TSB of the preferred embodiment are designed to support the following features:

support MESI and MOESI protocol;

native execution of PP-Channel command definitions, which are comprehensive enough to indirectly implement commands for multiple processor and bus types;

support 39-bit address space;

support Tag-sectoring technique (2 or 4 cache-lines per sector);

executes transactions according to the sequential states predefined for the entire system (the sequential state behavior of the system for major transaction types is specified in a table referred herein as the Transaction Protocol Table (TPT));

support fixed priority and rotating priority arbitration scheme either between each individual IF or between groups of IIFs;

support Bus Back-off (through tlock) and Address Back-off (through taddrboff) protocol. The backed-off transactions will be retried by LOCKOFF and AddrBoffesume commands. The back-off protocol provides the necessary support for maintaining atomic operation and ordering rules;

support TB and TSB flow control by using tfull and *if_trdy signals;

run at 200 MHz frequency, support pipelining operation at a rate of 200M transactions per second;

support speculative devices (such as MIF) and non-speculative devices (such as IIF);

support both cacheable devices and non-cacheable devices.

latency for speculative devices is 15 ns and latency for non-speculative devices is 30 ns; and mechanism to prevent starvation.

TB and TSB Signals. FIGS. 12A through 12C are a table of describing the various TB signals and identifying their associated driver and listeners. FIGS. 13A through 13E are a table of describing the various TSB signals and identifying their associated driver and listeners.

TB and TSB Implementation. TB and TSB are designed to run synchronously on a single 200 MHz clock. TB and TSB are pipelined to process 1 transaction per clock cycle and provide a total throughput of 200M transactions per second.

The functional units that are connected to the TB and TSB in the 8-processor FCU are: 10 IIFs, 1 MIF and 1 CFGIF. Theoretically, TB and TSB can be implemented by a tri-state bus structure. However, to achieve the desired 200 MHz clock speed with heavy loads, the TB and TSB should be implemented differently. The following description proposes a way to implement the TB and TSB with distributed muxes and an extra pipeline stage.

FIG. 14A is an abstract block diagram that shows the relationship of the TB and TSB to the rest of the system for a particular implementation. Point to point control signals (signals not starting with t or ts) as well as the tfull, tlock, taddrboff, tgartboff, tgartboffresume are not shown on the graph.

As shown in FIG. 14A, the TB is broken into two segments to reduce the loads on each segment. To avoid a tri-state bus structure, each segment of the TB is implemented with distributed muxes. At the end of each segment, a pipeline stage is added to realign the TB signals with the 200 MHz clock. In the next 200 MHz clock cycle, the TB signals go through a single mux and are driven to each individual IF.

The control signals of the muxes are generated by the TBARB block. The TBARB block should be placed in the middle of the TB with the two pipeline registers to reduce the propagation delay of the mux control signals from the TBARB to the muxes.

From a bus point of view, tfull, tlock and taddrboff are wired-OR signals. In the FCU design, each IF should split these signals into single-directional input signals: tfull, tlock, taddrboff; and output signals: full, lock, and addrboff. Each of the input tfull, tlock and taddrboff is simply the OR of the corresponding output signals. FIG. 14B illustrates how these control signals can be implemented. tgartboff, tgartboffresume are signal-directional signals driven by the MIF. Loading of the wires should be considered carefully.

Figure 15:
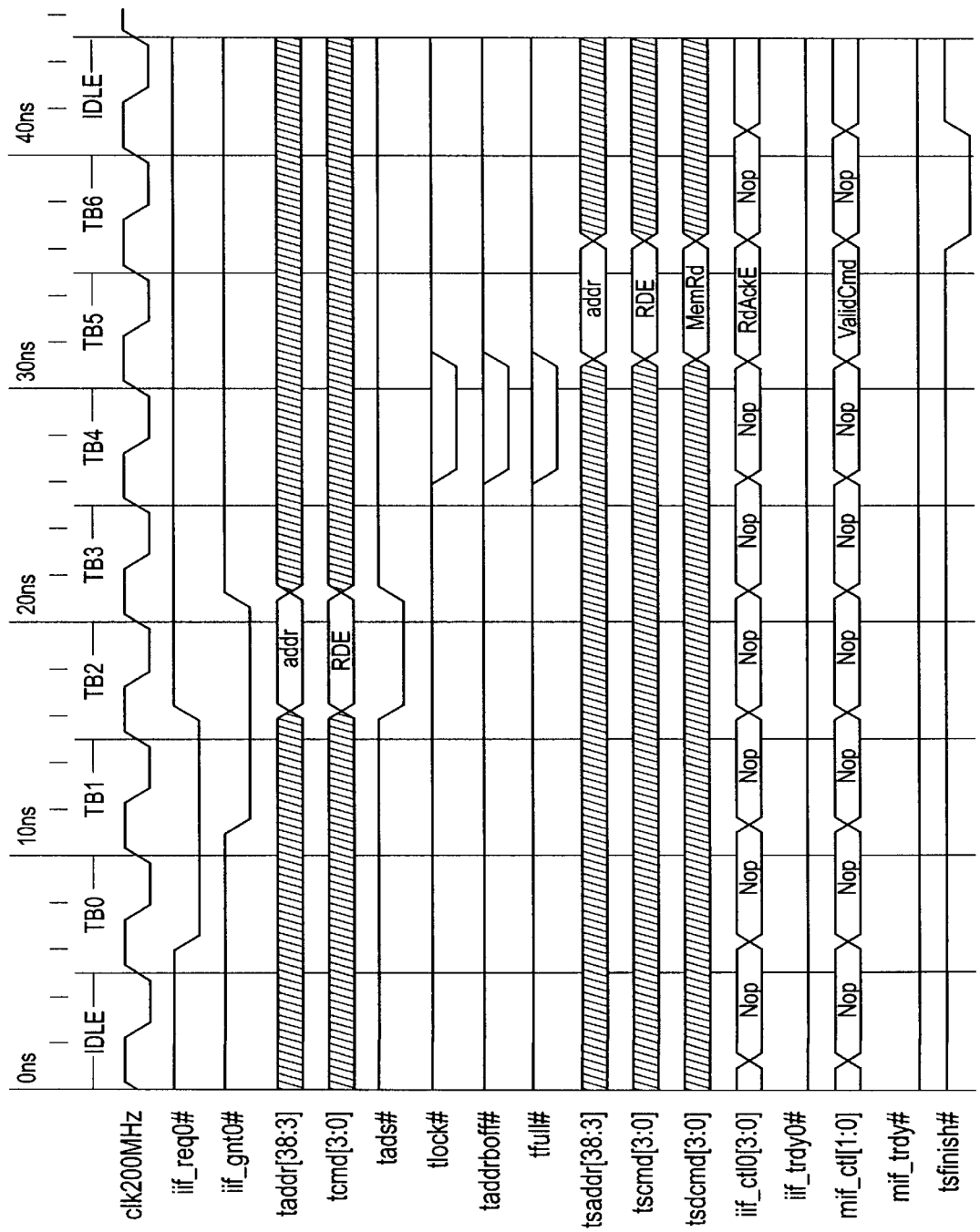
FIG. 15 is a timing diagram that illustrates a Block Read transaction on the TB and TSB.

Protocols and Timing. TB and TSB use pipelining technique to achieve a transaction processing rate of one transaction per clock. TB and TSB also support a Back-Off protocol and a Flow Control Protocol. FIG. 15 uses a ReadExclusive (tcmd=RDE, tlen=64, tbe=FF) transaction to show the stages a TB transaction has to go through. In the graph, it is assumed that the ReadExclusive misses all the L2 caches and the MIF becomes the target and provides the cache-line.

Transactions can be started back to back on the TB in a pipelined fashion. However, a typical TB transaction goes through seven stages from requesting the TB to the point that the transaction is acknowledged by the TC. Some of these stages are exactly one cycle, others may take one cycle or more.

TB0: Requesting the TB. 1 cycle or more.

TB1: TB is granted to the requesting IF with the highest priority. 1 cycle.

TB2: Address phase. 1 cycle. Speculative IFs latch transactions from TB in this phase.

TB3: TC: Tag lookup and Tag update. 1 cycle or more. All IFs: Address and command comparison, buffer full checking. 1 cycle TB4: TC: Scheduling phase. 1 cycle. All IFs: Assert tlock, taddrboff, tgartboff or tfull if the transaction is backed-off or buffer full. 1 cycle.

TB5: TSB phase, TC drives transaction status on to TSB and wait for IFs to sample the status. 1 cycle or more.

TB6: Finish phase. tsfinish indicates all IFs have sampled the status from the TSB. 1 cycle.

Note that not all transactions include all these 7 stages. The LOCKOFF and AddrBoffResume transactions have only phases TB0–TB2 and cannot be backed-off. Other TB transactions have all seven phases.

Figure 16A:
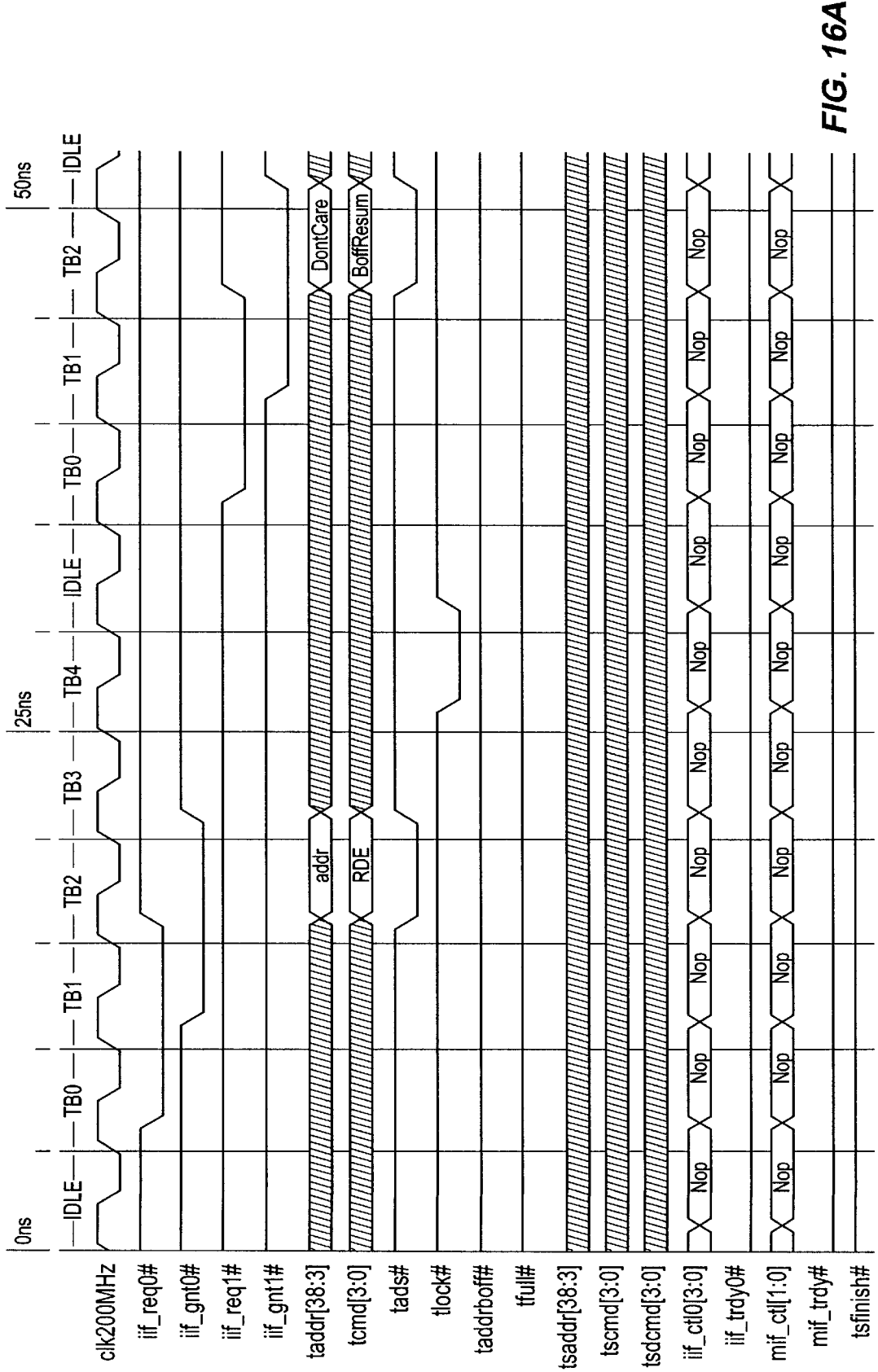
FIGS. 16A and 16B are two sequential timing diagram sections of an exemplary back-off and retry sequence that illustrates the Back-off Protocol.
Figure 16B:
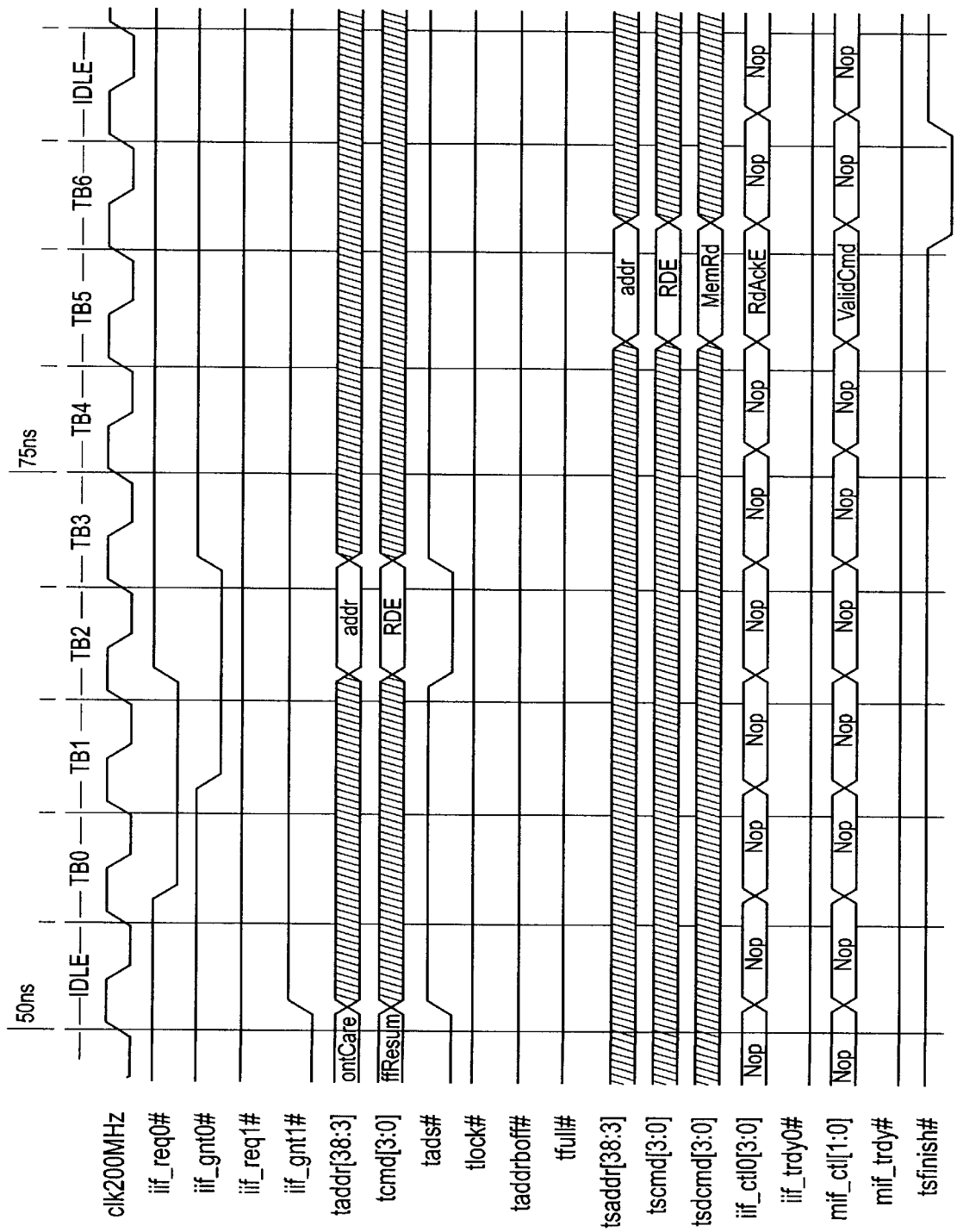

If a transaction is backed-off or the buffer full signal is asserted during TB4 (if tlock, taddrboff, tgartboff or tfull is asserted), that transaction is aborted and will retry from TB0. FIGS. 16A and 16B are two sequential timing diagram sections of an exemplary back-off and retry sequence that illustrates the Back-off Protocol. The following two sections explain the back-off and flow control protocol.

The Back-Off Protocol. The TB supports the Back-off protocol. A transaction may be backed-off by asserting tlock, taddrboff or tgartboff at phase TB4 of the transaction. I.e., the back-off signal has to be asserted exactly two cycles after the TB2 address phase in order to back-off a transaction. After seeing the back-off signal, the transaction is simply aborted. TC and all speculative IFs that have latched the transaction from the TB should ignore the transaction. The initiating IF should abort the transaction and save the transaction in its internal data structure for later retry. The backed-off transactions can only be retried after the assertion of the LOCKOFF, the AddBoffResume command, or the tgartboffresume signal.

LOCKOFF is global. The IFs that have asserted tlock should drive a LOCKOFF transaction on to the TB once the back-off condition is cleared. IFs having transactions backed-off by tlock should retry the backed-off transactions from TB0 once LOCKOFF is seen on the TB.

AddrBoffResume is address specific. The IFs that have asserted taddrboff should drive AddrBoffResume command with appropriate address on to the TB once the back-off condition is cleared. IFs having transactions backed-off by taddrboff should compare the AddrBoffResume address with the addresses of the backed-off transactions. Once a match is found, the matching transactions should be retried from TB0.

tgartboffresume signal is used by the MIF for GART cache support. MWF asserts tgartboff to back off the initiators that have missed the GART cache. Once the GART entry is fetched from the memory, MIF asserts tgartboffresume for one cycle. By using this signal, MIF can remain as a TB slave and avoid the troubles of being a TB initiator. Once sampled asserted, all IFs with transactions backed off by tgartboff should retry those transactions. Note that this signal can be asserted any time and does not follow general TB or TSB timing.

Back-off Related Starvation. The back-off protocol is designed to keep the TB available for use as much as possible. However, the retry and TB arbitration policy needs to be carefully considered to avoid the potential starvation problem.

Analysis of the Starvation Problem. The current Boff/BoffResume scheme contains four elements:
  the transaction that is being backed-off;
  the backing off IF;
  the backed-off IF; and
  the lock on which the transaction is backed off.

A transaction T initiated by IF A can be backed-off by backing off IF B, if T hits on a lock L owned by B. Once backed off, transaction T is put into A's internal data structure and waits for the lock L to be unlocked. When lock L is unlocked, backing off IF B informs all the IFs (including IF A) by sending a BoffResume that lock L is released. Transactions backed off by L can then be retried. Once the lock on T is released by BoffResume, IF A can begin to schedule T to be retried.

Note that transaction T can be backed-off by three types of locks, a bus lock indicated by the tlock signal, an address lock indicated by the taddrboff signal, and a GART lock indicated by the tgartboff signal. IF A may want to maintain three separate flags to record the tlock, taddrboff and tgartboff signals. IF A will only schedule to retry transaction T when all locks are released.

In the following analysis, we only consider back-offs generated and resumed by taddrboff, tlock, AddrBoffResume and LOCKOFF. Rules for the IIF and MIF to handle GART cache related back-offs (tgartboff and tgartboffresume) are closely related to the GART cache implementation.

Assuming we are using the rotating priority scheme. The Boff/BoffResume scheme is starvation free if:
  1) When lock L is released by a BoffResume from backing off IF B, transactions depending on lock L must be retried. The retrying IFs must be granted the Transaction Bus according to the priority assignment with IF B having the lowest priority.
  2) upon retry, a backed off initiator cannot be jumped over due to the assertion of the tfull signal.

Assume there are four IFs. A, B, C, and D. According to the rotating priority scheme, there could be four possible priority assignments. They are {A,B,C,D}, {B,C,D,A}, {C,D,A,B}, {D,A,B,C}. In the {A,B,C,D} case, IF A has the highest priority and IF D has lowest priority. Once an IF is granted the TB, the priority for that IF is changed to the lowest priority. Suppose currently the TB has priority assignment {A,B,C,D} and only IF C is requesting the TB. As the result, IF C is granted the TB and the priority assignment is changed to {D,A,B,C}, where IF C becomes the lowest priority IF. {D,A,B,C} is the priority assignment with C having the lowest priority.

When the above conditions are guaranteed, then no backed off transaction is jumped over. And all backed off transactions will be retried and be granted the TB according to the priority assignment right after the backing off IF is granted the TB.

However, to satisfy the above condition, special care needs to be taken by the TB protocol and IFs. This is because of the following three problems:

1. Retrying IFs may not see the required priority assignment.
   The TB is a pipelined bus. Between the time the backing off IF is granted the TB and the BoffResume is seen by the backed off IFs, the TB may have been granted to other IFs and one or more backed off IFs may have been jumped over.
2. The backed off IFs may not retry the backed off transactions right after they see the BackResume.
   There could be two reasons for this case, 1) The IFs' internal scheduling algorithm may not retry the backed off transactions right away. 2) There could be multiple backed off transactions pending within an IF and the IF can only retry one transaction at a time.
3. A retrying IF may be jumped over due to the assertion of the tfull signal.

The Starvation-Free TB. To have a starvation free TB, the above three issues have to be dealt with. To tackle Problem 1, we may specify the TB arbitrator and requesting IFs to have the following features:
  requesting IFs use iif__br* to inform the TB arbitrator that the current requesting transaction is a BoffResume transaction; and
  for BoffResume requests, once the TB is granted to the requesting IF, the TB arbitrator de-asserts all the grant signals and freezes the priority assignment rotation until the address and command of the BoffResume are driven on to the TB and are sampled by the backed off IFs.

To tackle Problem 2, the scheduling algorithm within each initiating IF must be able to keep retrying a specific transaction when it has been backed off for a pre-defined number of times. (I.e., that transaction becomes the highest priority transaction within the initiating IF).

To tackle Problem 3, the TBARB should not grant the TB to any other IFs before the back-off retry transaction finishes. There are two ways to achieve this:
  1) For any transaction, the TB does not grant TB to other IFs until it sees tfull not asserted in TB4. In this option, the TB is effectively running at one quarter of the full speed.
  2) Each initiator drives a signal line to the TBARB to indicate that the requesting transaction is a back-off retry transaction. The TBARB will only slow down the TB for back-off retries.

If the TBARB stops granting TB temporarily to other Ifs, the TB will slow down. In recognition of this fundamental tradeoff, the TB can be configured to work in one of two modes: Fast mode and starvation free mode. In the fast mode, the TB arbitrator works without taking starvation into account. In the starvation free mode, the TB arbitrator tackles the starvation problem by de-asserting the grant signals and freezing the priority rotation. The initiating IFs use iif__sfm* to switch the TB arbitrator between the two modes. The iif__sfm* may be asserted when one of the transactions within the initiating IF has been backed off for a pre-defined number of times (the same condition as used by the initiator to tackle Problem 2, see above). The iif__sfm* may be de-asserted when the condition is cleared.

The TB Flow Control Protocol. TB supports a flow control protocol using the tfull signal. TC or IFs use tfull to indicate that they are not ready to accept TB transactions. Just as tlock and taddrboff, tfull is asserted in the TB4 phase, exactly 2 cycles after the address phase. However, unlike the back-off protocol, the initiating IF for the transaction can keep retrying the transaction once tfull is sampled asserted.

In the TB flow control protocol, there is no "resume" command to start the retries.

The TSB Flow Control Protocol. TSB flow control protocol is supported by point-to-point *if_trdy signals. *if_trdy signals indicate whether IFs are ready to accept data from the TSB. Data are latched from the TSB on the first clock edge after both *if_trdy and *if_ctl are valid.

After all the IFs with valid *if_ctl have latched data from TSB, tsfinish is asserted for one cycle to indicate the end of the transaction. In some cases, tsfinish may be used by the initiator to release its internal lock buffer entries.

Figure 17:
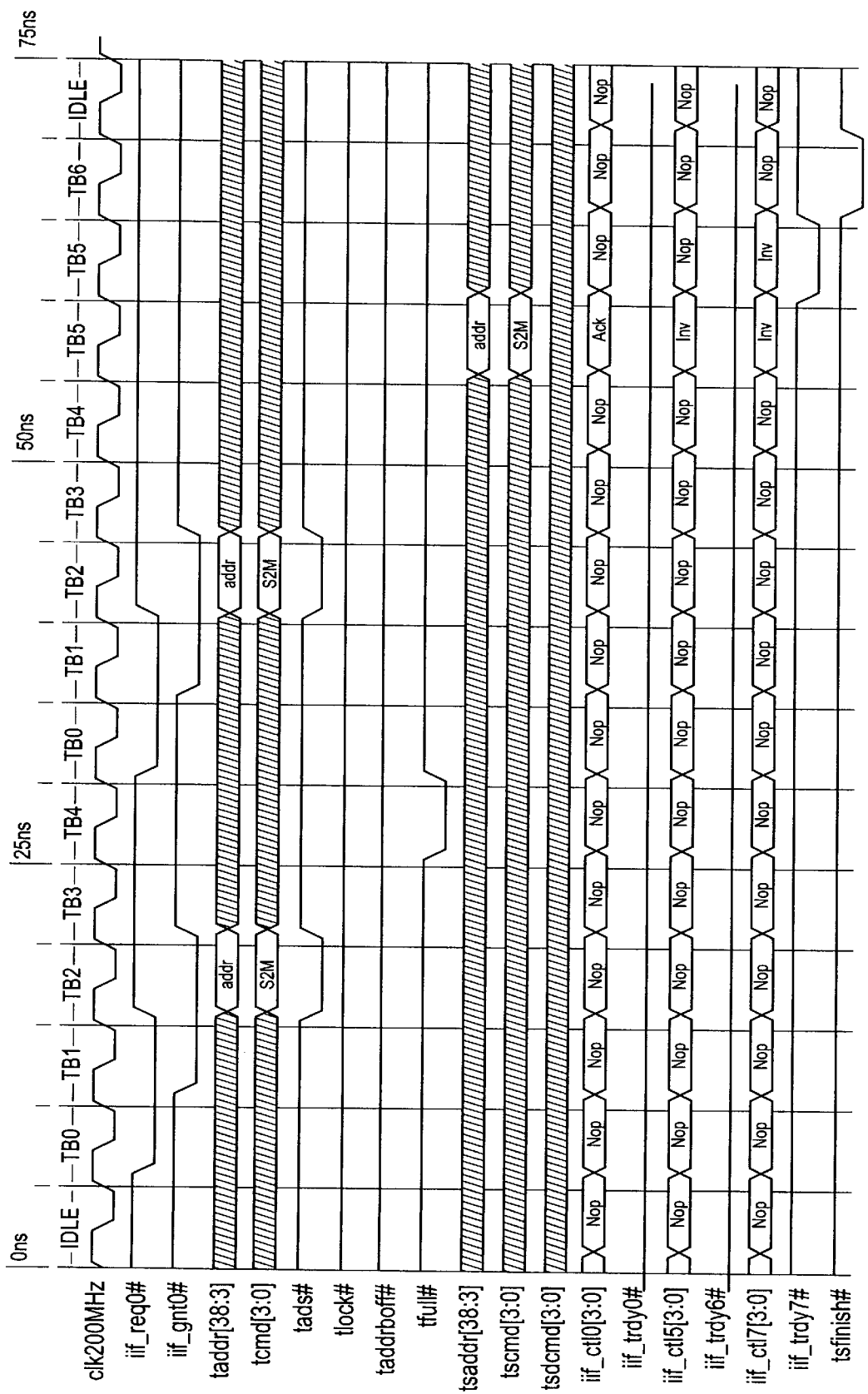
FIG. 17 is a timing diagram for the TB and TSB that illustrates the Flow Control Protocol.

FIG. 17 shows an example of the TB and TSB flow control protocol. Note that S2M is a PP-Channel sub-command that is encoded on the tbe[7:0] signals (see the PP-Channel definitions for details). S2M is used to inform the system that the L2 will be doing a cache-state transition from S to M upon the success of the transaction.

Conclusion

Although the present invention has been described using particular illustrative embodiments, it will be understood that many variations in construction, arrangement and use are possible within the scope of the invention. For example the number of units, banks, ways, or arrays, and the size or width, number of entries, number of ports, speed, and type of technology used may generally be varied in each component block of the invention. Functionally equivalent techniques known to those skilled in the art may be employed instead of those illustrated to implement various components. The names given to interconnect and logic, such as the Dual CPU Interface Unit, are illustrative, and should not be construed as limiting the invention. The present invention is thus to be construed as including all possible modifications and variations encompassed within the scope of the appended claims.

We claim:

1. A flow control unit for a symmetric multiprocessor system, the flow control unit comprising:
    a plurality of initiator interfaces configured to transfer transaction requests that correspond to data transfer transactions;
    a plurality of target interfaces;
    a data switch configured to provide a plurality of concurrent data paths between the initiator interfaces and the target interfaces to handle the data transfer transactions;
    a transaction controller configured to determine an order for handling the data transfer transactions in response to the transaction requests; and
    a transaction bus configured to transfer the transaction requests from the transaction initiator interfaces to the transaction controller.

2. The flow control unit of claim 1 further comprising a transaction state bus configured to transfer transaction state information from the transaction controller to the initiator interfaces and the target interfaces.

3. The flow control unit of claim 1 wherein the transaction controller is configured to implement a cache coherency protocol.

4. The flow control unit of claim 1 wherein the transaction controller is configured to maintain sets of duplicate cache tags with one of the sets for each multiprocessor L2 cache.

5. The flow control unit of claim 4 wherein each of the sets are divided into separately accessible banks.

6. The flow control unit of claim 4 wherein each of the sets include a write queue to receive cache tag updates.

7. The flow control unit of claim 1 wherein the transaction bus uses a rotating access scheme for the initiator interfaces.

8. The flow control unit of claim 1 wherein the transaction controller is configured to map addresses from the transaction requests.

9. The flow control unit of claim 1 wherein the transaction controller is configured to stop one of the data transfer transactions in response to a back-off event.

10. The flow control unit of claim 1 wherein the flow control unit is comprised of a single integrated circuit chip.

11. A method of operating a flow control unit for a symmetric multiprocessor system, the method comprising:
    transferring transaction requests from a plurality of initiator interfaces over a transaction bus to a transaction controller wherein the transaction requests correspond to data transfer transactions between the initiator interfaces and target interfaces;
    in the transaction controller, determining an order for handling the data transfer transactions in response to the transaction requests; and
    in a data switch, providing a plurality of concurrent data paths between the initiator interfaces and the target interfaces to handle the data transfer transactions.

12. The method of claim 11 further comprising transferring transaction state information over a transaction state bus from the transaction controller to the initiator interfaces and the target interfaces.

13. The method of claim 11 further comprising, in the transaction controller, implementing a cache coherency protocol.

14. The method of claim 11 further comprising, in the transaction controller, maintaining sets of duplicate cache tags with one of the sets for each multiprocessor L2 cache.

15. The method of claim 14 wherein each of the sets are divided into separately accessible banks.

16. The method of claim 14 wherein each of the sets include a write queue to receive cache tag updates.

17. The method of claim 11 further comprising using a rotating access scheme on the transaction bus for the initiator interfaces.

18. The method of claim 11 further comprising, in the transaction controller, mapping addresses from the transaction requests.

19. The method of claim 11 further comprising, in the transaction controller, stopping one of the data transfer transactions in response to a back-off event.

20. The method of claim 11 wherein the flow control unit is comprised of a single integrated circuit chip.

* * * * *